Dec. 23, 1958 O. K. KELLEY ET AL 2,865,227
TRANSMISSION CONTROL SYSTEM
Filed June 4, 1952 9 Sheets-Sheet 9

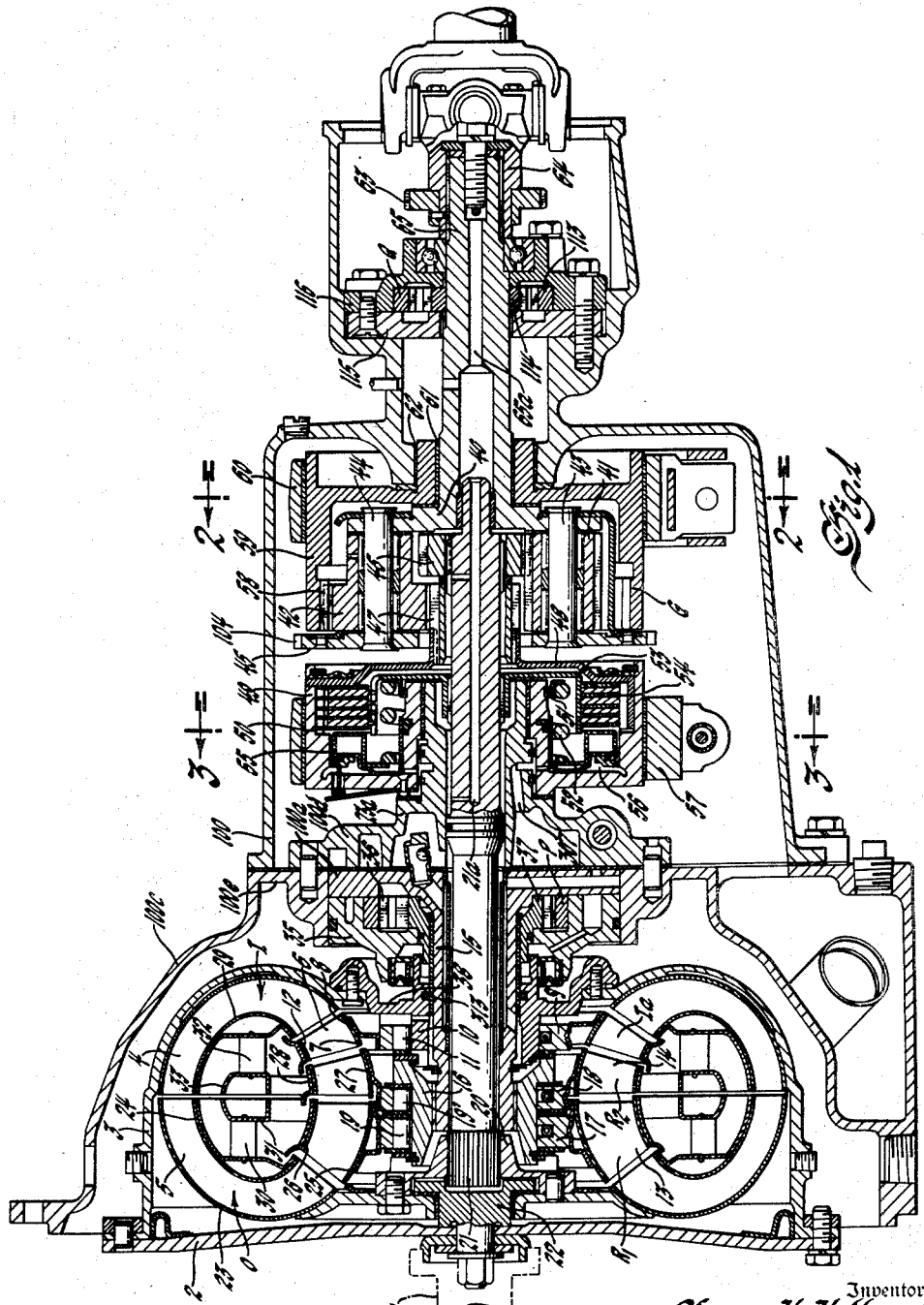

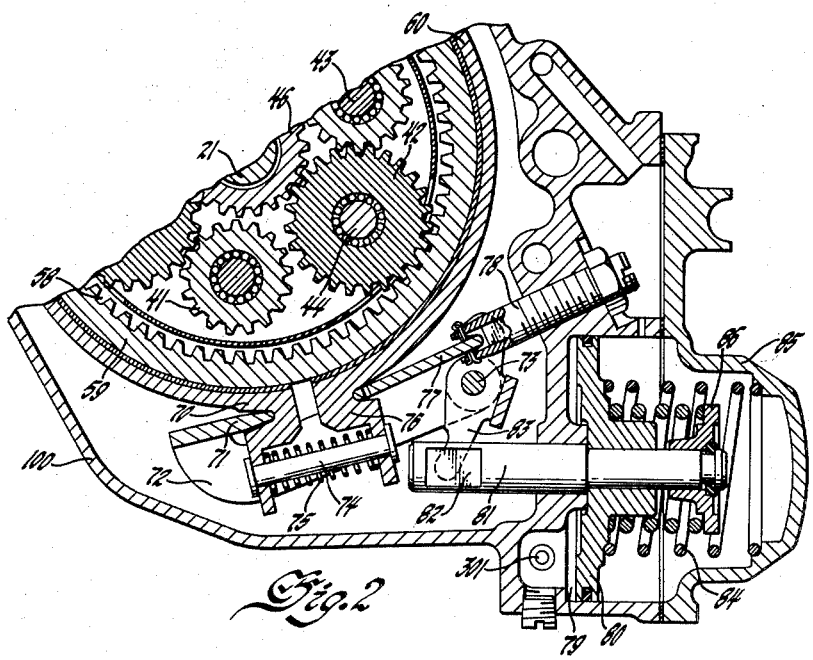

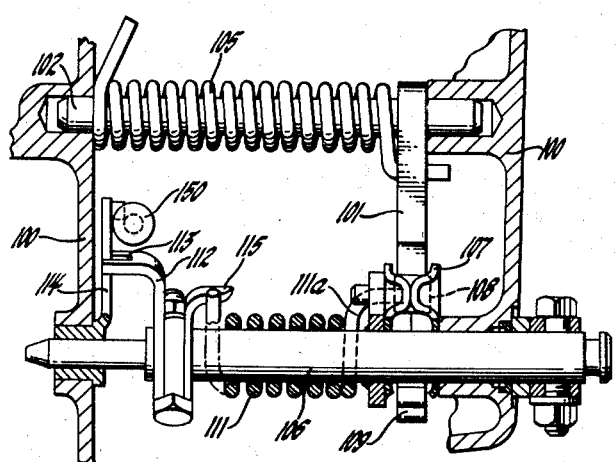

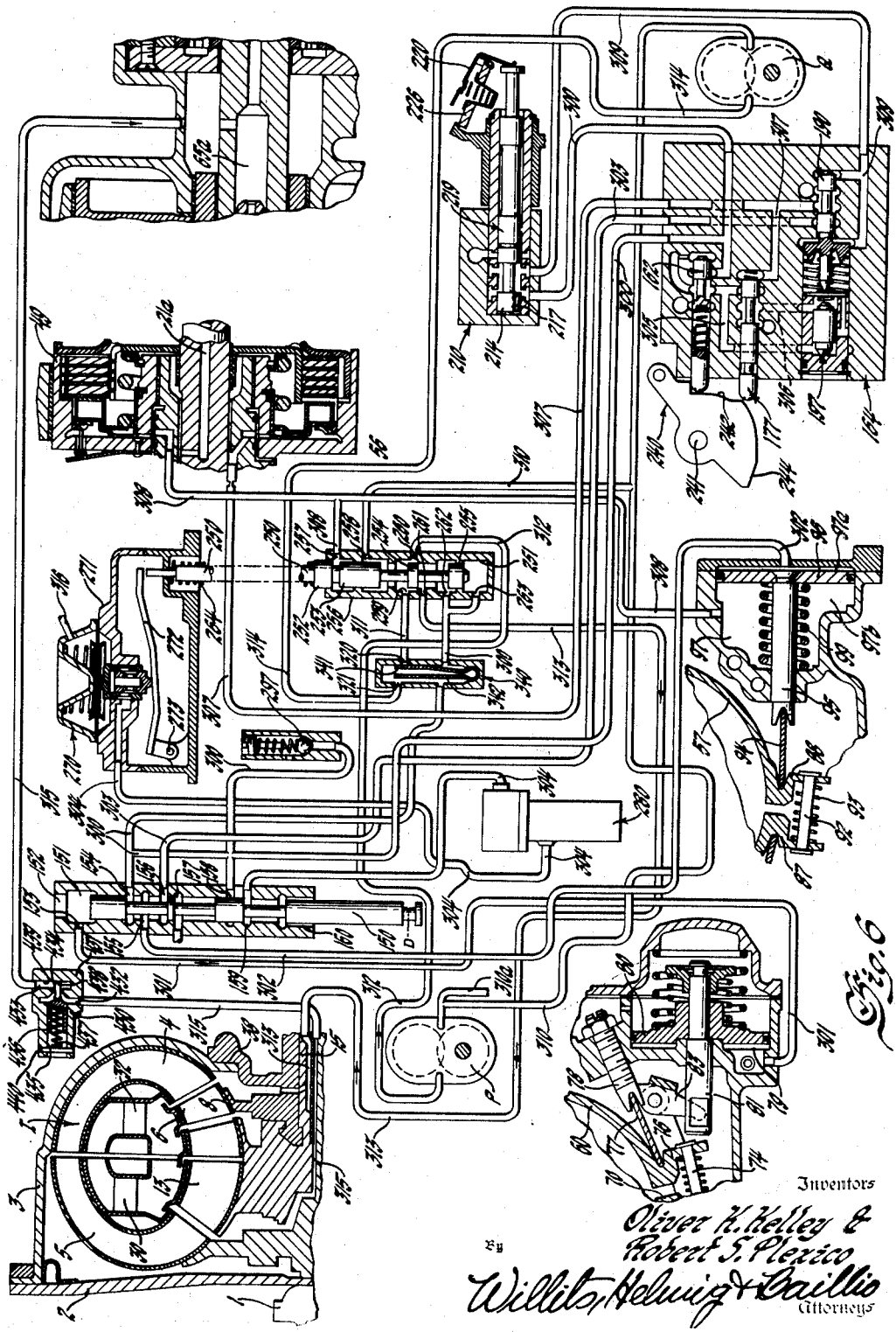

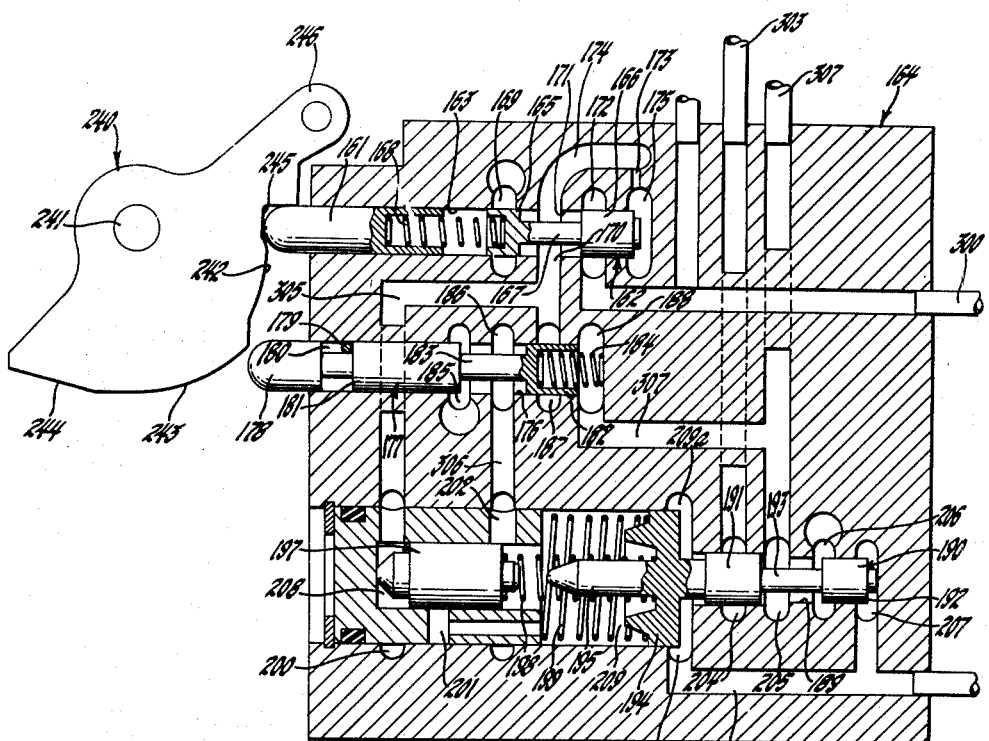
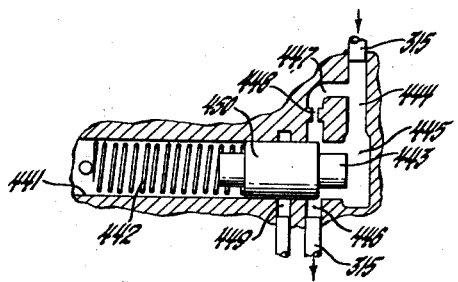

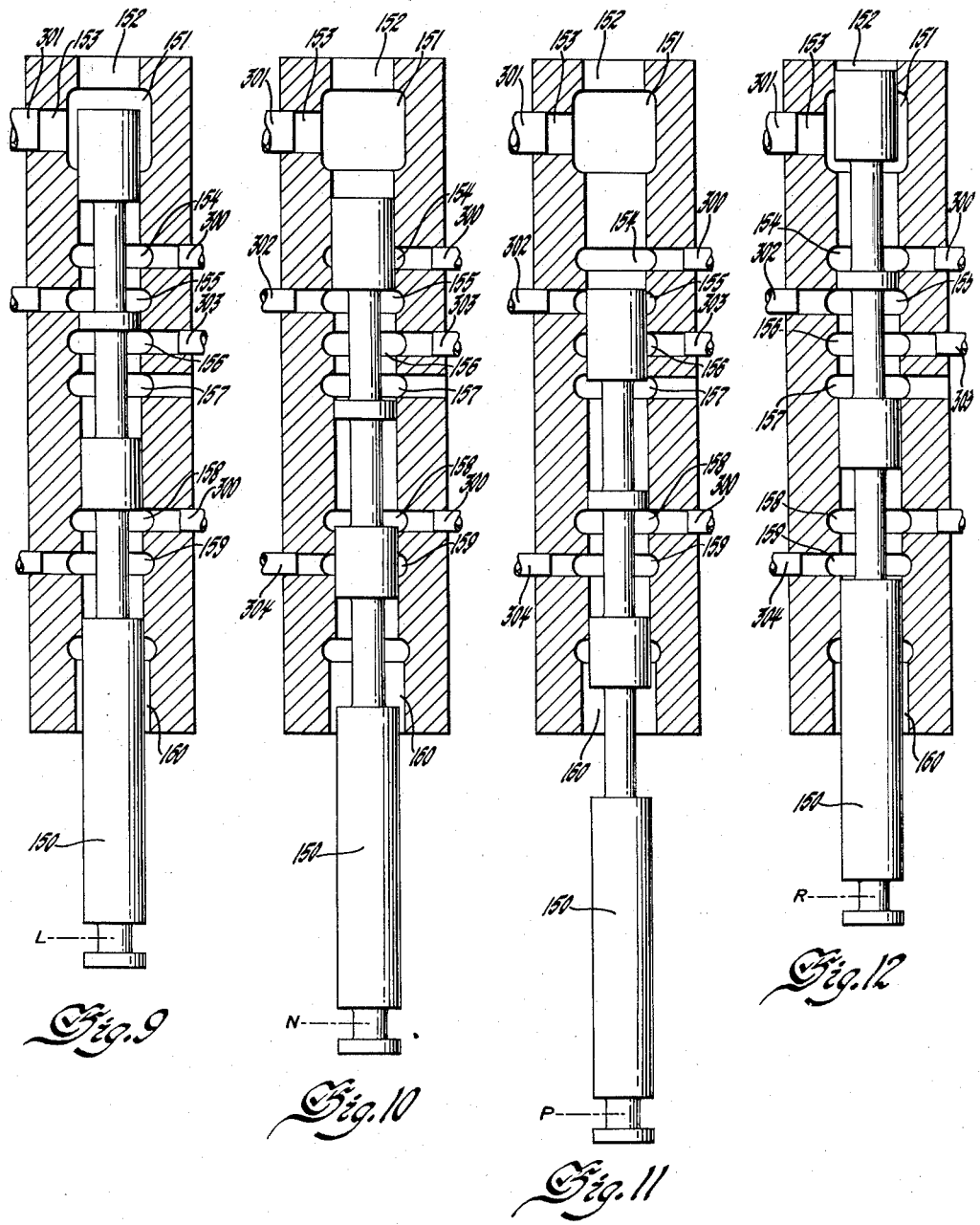

Inventors
Oliver K. Kelley &
Robert S. Plexico
By Willits, Helmig & Baillie
Attorneys

United States Patent Office 2,865,227
Patented Dec. 23, 1958

2,865,227

TRANSMISSION CONTROL SYSTEM

Oliver K. Kelley, Birmingham, and Robert S. Plexico, Royal Oak, Mich., assignors to General Motors Corporation, Detroit, Mich., a corporation of Delaware Application June 4, 1952, Serial No. 291,692

27 Claims. (Cl. 74—645)

This invention relates to a combination of fluid torque converter and gear drive mechanism which provides for torque multiplication in the hydraulic torque converter and for step-ratio gearing mechanism driven by the torque converter.

It relates to arrangements of fluid turbine torque converters with gearing, wherein the fluid torque converter is of a type which is operative from maximum torque multiplication to substantially 1-to-1 drive; and to the combination of such a torque converter with change speed gearing in which the gear ratio is arranged to be changed under torque by fluid pressure actuation and control mechanism.

It pertains further to a combination torque converter and step-ratio gearing transmission and control system therefor for providing automatic shift of the gear ratio of the gearing unit as determined by vehicle speed and engine torque.

The invention pertains to a combination torque converter and step-ratio gearing and control system incorporating a fluid pressure controlled shift valve for determining the gear ratio of the step-ratio gearing together with a manually controlled valve effective at driver will to override the fluid pressure controlled shift valve for forced downshift.

An additional feature is the provision of a manually operable valve adapted in one operative position to bypass the shift valve to provide continuous direct drive through the planetary gearing unit irrespective of the position of the hydraulically controlled shift valve.

An object of this invention is to provide a combination torque converter and planetary gearing transmission vehicle drive and control system therefor constructed and arranged to provide for rapid vehicle acceleration and economy of operation whereby power losses in the torque converter are minimized.

Another object of this invention is to provide an automatic control system for a combination torque converter and planetary gearing drive constructed and arranged to initially provide for reduction drive through the planetary gearing unit when the vehicle is started from a standstill and to provide for automatic shifting to direct drive through the planetary gearing unit as the vehicle speed increases.

A further object of this invention is to provide in an automatic control system of the type described, a manual valve selectively operable for forcing a downshift to reduction gear drive through the planetary gearing unit after direct drive through the planetary gearing unit has been established by automatic operation of the control system.

Another object of this invention is to provide in a control system of the class described and having a shift valve automatically operable for selecting the gear ratio of a planetary gearing unit, a novel control valve assembly for controlling the position of the shift valve to select reduction drive or direct drive through the planetary gearing unit.

Still another object of this invention is to provide in a control system of the class described, a novel governor responsive to vehicle speed for delivering a variable metered pressure to the control system shift valve to cause shifting from reduction drive to direct drive through the transmission planetary gearing unit.

A further object of this invention is to provide in a control system of the class described, a manually operable overcontrol valve for establishing direct drive in the planetary gearing unit irrespective of the action of the shift valve.

An additional object of this invention is to provide for continuous fluid flow through a torque converter and to utilize pressure discharged from the torque converter for lubricating gearing driven by said torque converter.

Still another object of this invention is to provide in combination with a torque converter having a pressure supply passage and a pressure discharge passage arranged for continuous flow of fluid therethrough, a restriction for regulating fluid pressure in the torque converter together with means responsive to fluid pressure in the discharge passage for varying the effectiveness of said restriction.

These and other objects and advantages of this invention will be apparent from the following specification and claims taken in conjunction with the accompanying drawings in which:

Figure 1 is a vertical section taken through the transmission assembly to show the relative positions of the parts and units.

Figure 2 is a part section taken at 2—2 of Figure 1 to show the reverse drive actuator mechanism.

Figure 3 shows a part section taken at 3—3 of Figure 1 to show the reduction gearing actuator.

Figures 4 and 5 are sectional views of the parts of a manual control linkage connecting the manual selector valve operating and parking brake mechanism with the primary manual controls.

Figure 6 is a schematic diagram of the hydraulic control system of the transmission.

Figure 6a is a schematic diagram of a torque converter pressure regulator valve which may be used in place of the torque converter pressure regulator valve of Figure 6.

Figure 7 is an enlarged view of the valve mechanism illustrated at the lower right hand corner of Figure 6.

Figure 9 is a partially sectional view of the manual selector valve illustrating the valve as positioned for low range of transmission operation.

Figure 10 illustrates the manual selector valve as positioned for neutral.

Figure 11 illustrates the manual selector valve positioned for park.

Figure 12 illustrates the manual selector valve positioned for reverse operation of the transmission.

Figure 13 is an enlarged view of the control system accumulator and hydraulic and vacuum modulators.

Figure 8:
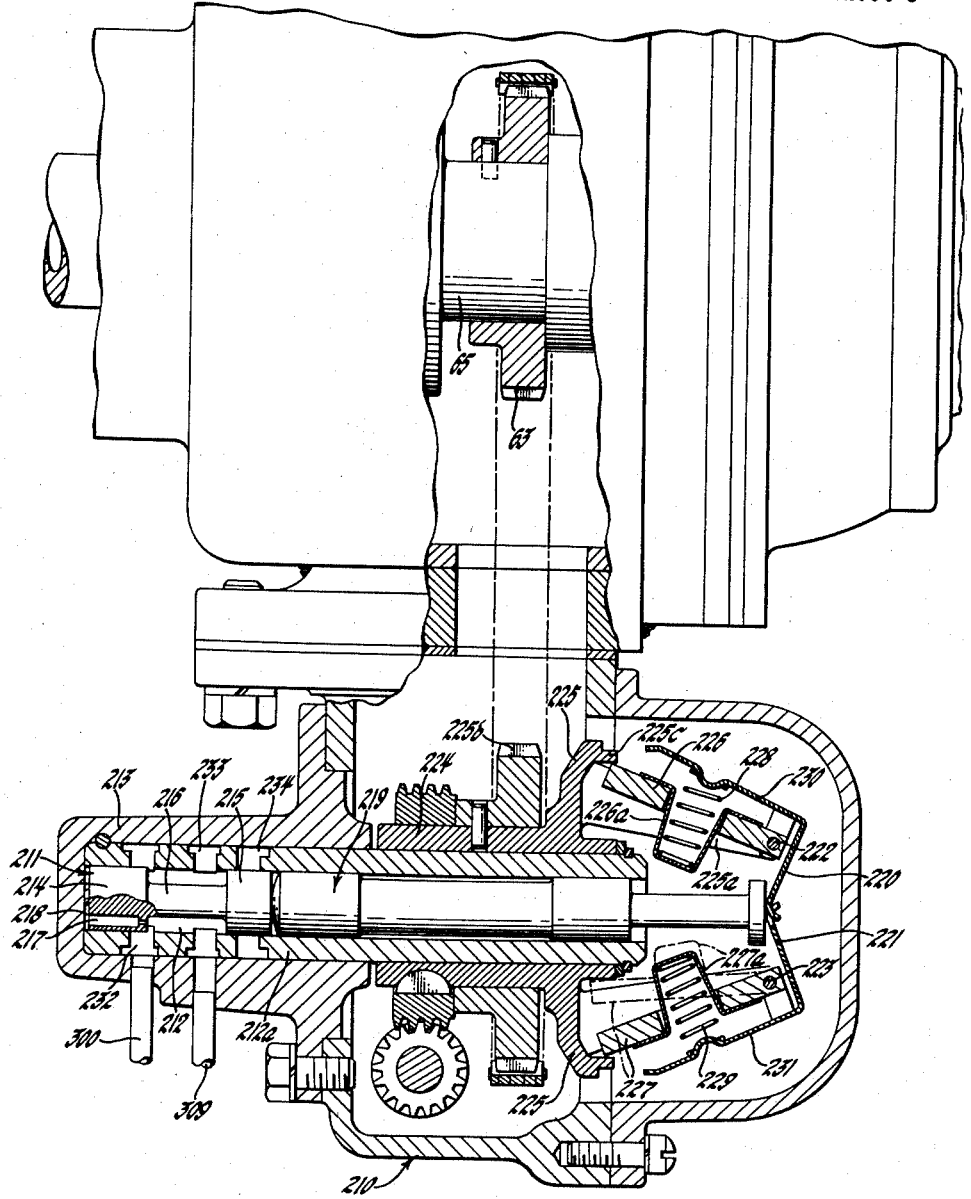
Figure 8 is an enlarged view of the governor and drive therefor.

Figure 1 is a vertical section taken through the transmission assembly to show the relative positions of the parts and units. The vehicle engine (not shown) is located at the left and constantly drives the torque converter unit located immediately behind the engine, which torque converter unit is arranged to drive the assembly output shaft 65 through a two-speed and reverse planetary gear unit. The torque converter unit is contained within a housing section 100c while the gearing unit is contained within a housing section 100 continuous with housing section 100c.

The engine crankshaft 1 is bolted to a flywheel 2 which is attached to a drum 3 acting as a container for the converter unit. The drum 3 carries a plurality of blades 4 forming an impeller I of the converter, which blades deliver circulating working fluid to the blades 5 of the output turbine rotor O. An auxiliary impeller Ia having its blades 6 located inward radially from the blades 4 has its hub 8 attached to a member 9 of a one-way clutch, and the member 9 with the inner race 10 attached to drum 3 provides a working space for one-way clutch members 11. A core section 12 supports blades 6 at the inner side of the blades. The one-way clutch member 9 has the usual cam slots set at an angle with respect to the direction of rotation so that the auxiliary impeller Ia may rotate forwardly faster than the primary impeller I but not slower than the latter.

The bladed working space of the torque converter is completed by a pair of reaction rotors bladed at 13 and 14, the first of which receives fluid from the turbine rotor O, delivering the same to reaction wheel blades 14, which latter blades in turn deliver the fluid to the auxiliary impeller Ia having blades 6. A web 100e of housing 100c is assembled with a radial flanged portion 100a bolted and keyed between sections 100e and 100d, and a cylindrical sleeve 15 is splined to the collar of web 100e and to the inner race member 16 of the one-way brakes. The outer cam member 17 is attached to reaction rotor $R_1$, and the outer cam member 18 is attached to the reaction rotor $R_2$. One-way locking members 19 and 19' are located between the members 16 and 17, the members 19 being adapted to engage member 17, while the members 19' are adapted to engage the member 18. These reaction locking one-way brakes by reason of connection with the inner member 16 and the non-rotating splined sleeve 15 are arranged to prevent backward but permit free forward rotation of the reaction rotors $R_1$ and $R_2$.

The output rotor O is mounted on a hub 20 which is splined to the centrally located shaft 21 supported by means of the pilot bearing 22. The shaft 21 extends to the right where it is splined to a sun gear 46 and a clutch hub 53.

For convenience, the main impeller having blades 4 is denoted by I; the output turbine having blades 5 by O; the first reaction wheel with blades 13 by $R_1$; the second reaction wheel bladed at 14 by $R_2$; and the auxiliary impeller supported blades 6 by Ia.

The shell 23 and the core section 24 support blades 5 of rotor O on hub 20. The hub 25 and core section 26 support blades 13 of rotor $R_1$. The hub 27 and core section 28 support blades 14 of rotor $R_2$. Blades 4 of impeller I are supported in core section 29 and by drum 3. The torque converter main fluid working space lies between the inner and outer blade supporting elements, the fluid body of which has both toroidal gyration and rotation about the main axis. The auxiliary impeller has blades 6 supported in hub portion 7 and core section 12.

A second working fluid space is enclosed within the core ring sections 24, 26, 28, 12 and 29, there being reverse torque impeller blades 30 attached to the core ring section 24 reinforced by inner core ring piece 31 and reverse torque rotor blades 32 attached to the core ring section 29, reinforced by inner core ring piece 33. There is a free unbladed tortuous channel between the inner core ring pieces 31 and 33. Under overtaking torque, the blades 30 located at a slightly greater radial distance than blades 32, deliver fluid at an accelerated velocity to blades 32 so that a degree of engine braking is obtained which increases the driver safety factor as against coasting or free wheel effect experienced with other forms of fluid torque converters. The blades 30 and 32 are both of curved section, and under normal torque converter drive, their convex back portions are rotating relatively so that whatever fluid impingement exists within the inner core ring working space, is highly inefficient, with only a small fraction of the torque being transmitted on a fluid flywheel basis. Under overtaking torque, the blades 30 act as impellers and deliver fluid from their concave pockets to the opposing concave pockets of blades 32 at sufficient kinetic value to provide in effect a fluid flywheel torque transfer device, capable of starting a stalled engine, for example, and useful for engine braking, thereby reducing the need for use of the vehicle brakes.

A pair of pumps P and Q are provided to maintain the working space of the converter filled at all times and also for supplying fluid pressure utilized to actuate servo mechanism to determine the gear ratio of the gearing unit. The servo mechanisms and the control system therefor will be described further.

The front or engine driven pump P is supported by the radial portion of web 100e against which is fitted a pump body 35 and plate 100a properly formed to accommodate the driven pump gear 36 and the driving gear 37 fixed to an axial extension of hub 38 bolted to the drum 4. The ported plate 100a is formed into an axial sleeve 15 which surrounds a portion of the shaft 21.

The rear or vehicle tail shaft driven pump Q is assembled in the rear portion of the casing section 100, the pump including two attached portions 115 and 116 bolted together, the portion 115 being a ported plate forming an end wall, and the portion 116 being recessed and providing bearing for the driven gear 113, the meshing driving gear 114 being keyed to the shaft 65. The pump connections are shown in Figure 6.

As shown in Figure 6, the arrows leading from the pump P indicate the flow of oil from pump P to the converter working spaces. The converter supply passage 313 conducts pressure fluid to a space beneath member 15 to a point beneath one end of the axial flange of hub 38. The oil flows radially outward between the hub 8 of rotor I and the hub 38 of drum 3, and enters the working space between the blades 6 of the auxiliary impeller Ia and the blades 4 of impeller I. Oil may escape from the working space through the space between the blades 5 and 13 and travel radially inward of the space between the reaction rotor $R_1$ and the turbine member O, and along the space external of shaft 21 inside the axial portion of the non-rotating casing element 100e and the sleeve 15 and from there by delivery passage 315 for connection to the transmission for lubrication purposes. A torque converter pressure regulator valve 430 is disposed in the discharge passage 315 from the converter for maintaining a constant pressure head of fluid within the torque converter. It is well known that the viscosity of oil varies with temperature changes even though so-called constant viscosity oils may be used. In systems of the type employed wherein the discharge of fluid from the coupling is directed to the transmission unit for lubrication purposes, the pressure level of the fluid within the coupling will vary with the rate of discharge of fluid from the coupling, the rate of discharge, in turn, depending upon oil viscosity.

Torque converter pressure regulator valve 430 is placed in series with the converter discharge passage 315 to regulate the rate of flow of oil from the converter, valve 430 being responsive to fluid pressure in passage 315 both upstream and downstream of the valve. As shown, valve 430 is made up of a casing 431 having ports 432 and 433 and an orifice 434 between the ports. A cylinder 435 in casing 431 is adapted to receive a piston 436 having a hollow portion adapted to receive a spring 437. A pin 440 extends transversely of the axis of the cylinder to anchor one end of spring 437. One end of the cylinder is left open to permit any oil which may leak past piston 436 to drain back to the transmission sump to prevent any possibility of an oil block. Extending outwardly from the force of piston 436 opposite from spring 437 is a stem 438 having a portion of generally cylindrical configuration and a base portion of generally conical configuration. Stem 438 is of such length that the end of the stem will contact wall 439 of casing 431 before the conical portion of the stem is able to completely block off orifice 434. Thus, oil is continuously permitted to drain through passage 315 even though the pressure regulator valve is effective to provide its maximum restriction. As the pressure in the converter increases, piston 436 is forced against spring 437 to move stem 438 in orifice 434, the valve pin being effective to vary the effective opening of orifice 434 to regulate the pressure level of the fluid within the torque converter. The valve arrangement assures a substantially constant pressure level of oil within the converter regardless of oil temperature, rotational speed of the converter parts, or the pressure level of fluid supplied to the converter through passage 313. As hereafter more fully explained, the pump line pressure is greater in reverse than in forward operation of the transmission.

An alternative form of torque converter pressure regulator valve is shown in Figure 6a. As shown, a pressure regulator valve 450 is positioned in series with passage 315 to regulate the rate of discharge of pressure fluid from the torque converter. Valve 450 is disposed in a bore in casing 441 being biased by a spring 442 toward a position wherein a reduced extension 443 of valve member 450 may contact the end of the valve bore when the pressure in passage 315 is not sufficient to cause valve 450 to compress spring 442. A port 444 permits pressure from the torque converter to enter a pressure chamber 445 beneath valve 450. Port 446 is the outlet port from the valve bore to the downstream side of passage 315. A by-pass passage 447 permits a continuous restricted flow of fluid from the converter through passage 315, there being a fixed orifice 448 in passage 447. Port 449 is illustrated as being an exhaust port adapted to exhaust excess pressure to sump.

In operation of the torque converter pressure control valve of Figure 6a, a continuous restricted flow of fluid through the lubrication supply passage 315 is provided since valve 440 does not prevent flow of pressure fluid through branch passage 447 and fixed orifice 448 to port 446 and the downstream portion of passage 315. In the event that torque converter pressure tends to become excessive, fluid pressure in chamber 445 will force valve 440 to open port 446 to chamber 445 to permit more rapid flow of pressure fluid through passage 315. In the event of unusually high torque converter pressure, valve 440 may move a sufficient distance to uncover exhaust port 449 to exhaust excess pressure to the transmission sump. Port 449 may be omitted in the arrangement of Figure 6a if desired.

The gearing arrangement of Figure 1 includes a centrally placed gear unit G having a planet gear carrier 40 formed inwardly upon or secured to the final output shaft 65 and having a double set of meshing planet gears 41 and 42 supported on spindles 43 and 44 respectively, the carrier 40 being provided with a toothed web 45 at the left. The planet gears 41 extend axially to the full width between the radial portions 40 and 45 of the carrier and mesh internally with sun gear 46 secured to shaft 21, and externally with the short planet gears 42 as indicated in Figure 1. A second sun gear 47 is meshed with the planets 42 and is splined to a radial web 48 of drum 49, the latter drum being splined internally to accommodate clutch plates 50. The drum 49 includes a radially extending portion and having a keyed flange 51 secured to an axially extending flange at the inner side of the radial portion of the drum. This flange 51 acts as a retainer for a clutch release spring 52 and internal clutch hub 53 is splined to shaft 21 and is externally splined to accommodate clutch plates 54 which extend between and are adapted to be engaged with clutch plates 50 carried by clutch drum 49. A clutch presser piston 55 is mounted to slide inside the drum 49 and is normally held to the left by the clutch release spring 52, which bears against the flange 51. As will be understood in further detail set forth later herein, fluid pressure is admitted by passage 307 at the left to cylinder 56 between the radial wall of the drum 49 and the piston member or presser 55 to compress the stack of clutch plates 50, 54 for obtaining a locking couple between the sun gears 46 and 47. By engaging the clutch plates, sun gear 46 is locked to sun gear 47, thereby establishing direct drive between shafts 21 and 65 through the gearing.

A brake band 57 extends around the drum 49 so that the drum may be held against rotation, thereby causing the sun gear 47 to stand still, and requiring the planet pinions 42 to roll around the sun gear 47. Thus when the band 57 is engaged to the clutch drum 49, the shaft 21 drives the shaft 65 at low gear ratio.

The planet gears 42 mesh with an annulus gear 58 carried by and fastened to a drum 59 supported on bearings 61 extending around a cylindrical portion of the carrier 40. A brake band 60 extends around the drum 59 and may be applied to the drum for preventing rotation of the drum and annulus gear 58 to establish reverse drive between the shafts 21 and 65.

The rear portion of the gear casing 100 supports the shaft 65 by bearing 62. The shaft 65 is splined for a governor drive chain sprocket 63 and for a universal joint coupling sleeve 64.

As described to this point, the engine drives the torque converter assembly, which in turn drives shaft 21 and sun gear 46 of the gear unit G. The three driving conditions for shaft 65, namely low range, high range, or reverse gear drive, are determined by the application of band 57, clutch plates 50, 54, or band 60 respectively.

In Figure 2, the casing 100 is broken away and the part sections of reverse band 60 and drum 59 of annulus gear 58 of Figure 1 are shown. The band end 70 is notched to receive a webbed shaped tang 71 of member 72 mounted on pivot 73 supported in the casing 100, and has a projecting ear apertured for receiving a bolt 74 for providing a seat for one end of a releasing spring 75. The other end 76 of band 60 is similarly notched to receive a strut piece 77 pivoted in a notch of an adjustable anchor 78, and is pierced to accommodate bolt 74 and provide a seat for the other end of spring 75.

The casing 100 is recessed to form a cylinder 79 for piston 80 and is apertured to receive piston rod 81 slotted at 82 to register with a rocker lever 83 pivoted on shaft 73. The upper end of rocker lever 83 is formed to engage strut 77 to apply the band 60 to drum 59 when the piston 80 is urged by pressure fed to passage 301 to compress the brake release springs 84.

Pressure in cylinder 79 applies the band 60 and release of the pressure permits spring 84 to release the band 60. The external casing section 85 forms the head for the cylinder 79. The pistons 80 have a limited sliding motion on rod 81 compressing the inner spring element until the end stop 86 is encountered, during the loading interval.

Figure 3 shows the casing 100 broken away and the part sections of low gear band 57 and drum 49 of the sun gear 47 of Figure 1. The band 57 terminates in end portions 87 and 88, the end 87 being notched to receive anchor strut 89 supported by the adjustable anchor 90 secured in the casing, and having ear 91 adapted to receive one end of the bolt 92 and support an end of spring 93. The end portion 88 is notched for strut 94 which fits into a notch of a piston rod 95 of piston 96 in the servo cylinder 97 formed in the casing. Ear 98 is adapted to receive the other end of spring 93 and bolt 92. The spring 93 spreads the band ends 87 and 88 for brake release. A spring 99 is the main brake retracting means, and a small spring 99a is threaded into strut 94 for establishing a given piston travel before the end 88 of the band 57 is moved for brake actuation. The casing portion 271 forms the head for cylinder 97. A passage 302 delivers band actuation pressure to the chamber 97a and the passage 308 is connected to the chamber 97b and to the regulator valve assembly of Figure 6 for the purposes to be described further.

The full detail of the construction at the right of Figure 3 is described in connection with Figure 13. Briefly, however the modulator control arm 272 acts upon one end of pressure regulator valve 250 of Figures 6 and 13, arm 272 being supported for pivotal rotation about a support pin 273 (see Figures 6 and 13). A pair of force transfer pistons 277 and 278 telescopically assembled as shown in Figure 13 are arranged to transfer force from spring 274 to control arm 272 to control pressure regulator valve 250. The effect of spring 274 is varied by the degree of engine vacuum, the spring being less effective as vacuum is increased. The pistons 277 and 278 are also forced apart by fluid pressure under some conditions of operation as hereafter explained to control the pressure regulator valve 250. Chamber 275a is connected to engine vacuum by means of passage 316, and fluid pressure is admitted to the interior of the telescopically associated pistons by means of passage 304.

Figures 4 and 5 illustrate the mechanism for operating the parking lock acting on the toothed member 45 of Figure 1 which rotates with the output shaft 65. The pawl member 101 is mounted for limited rotation, on shaft 102 supported in casing 100, and pawl teeth 103 are formed to intercept teeth 104 of carrier member 45 when the pawl is rotated counterclockwise. A pawl retracting spring 105 has one end bearing against the casing wall and the other end is hooked to apply a clockwise rotation to the pawl 101.

A shaft 106 is fitted to support an arm 107 for rotation, the swinging end of the arm having a channel formation presenting outer guide faces with a roller 108 pinned to act as a pawl contact member to intersect the motion of pawl 101. The adjacent edge of pawl 101 is cut out into a series of scalloped portions 109, the final form of the cut portion being that of a shallow cam 110. The arc of the arm 107 from the center of the shaft 106 with respect to the permissible motion and net thickness of the pawl 101 is such that when the arm 107 is at its extreme counter-clockwise position there is a positive locking force holding the teeth 103 of pawl 101 seated in teeth 104. Shaft 106 is caused to rotate in accordance with the positioning of the manual valve 150 of the control system. The station positions in counterclockwise sequence are reverse, low, drive, neutral and parking brake, denoted by the letters R, L, D, N and P, respectively.

The arm 107 is moved by a flexible ring in the form of a spring 111 extending about the shaft 106, the spring end 111a being adapted to grip the outer portion of the arm 107. A member 112 rotatable with the shaft 106 is forked at 113 for connection to a control link 114, and is formed with lateral finger 115 intersecting the adjacent end of spring 111. Movement of the external control toward parking lock position delivers force through spring 111 to rock the arm 107 counter-clockwise in Figure 5 for initial engagement of the pawl 101 with the carrier flange teeth 104. If the vehicle is still in motion, the rounded toothed ends tend to reject mesh of the pawl teeth at 103, and the flexible link spring 111 yields during the engaging interval. During this action, the control force applied by the external control opposes that of the pawl spring 105. The left end of shaft 106 is supported in a portion of a lever 114 which operates the manually operable control valve 150 of the hydraulic system.

Carrier 40 and teeth 104 cease rotation when the vehicle motion is stopped and the mesh rejection action stops, the stored energy in spring 111 seating the pawl teeth 103. Once seated, the angular relation of the arm 107 to the pawl cam face 110 is such that the flange teeth 104 cannot force the pawl teeth out of mesh.

The scalloped portions 109 on the edge of the pawl 101 adjacent the arm 107 serve as station feel poppets for the external shift selection control applied to the manual selector valve 150. The roller 108 by reason of its small diameter is capable of release action with very little force applied to the spring 111.

Referring to Figure 6, there is shown a schematic diagram of the fluid pressure control system used to actuate the various bands and direct drive clutch. The following table, sets forth the operative condition of the servo members for each condition of operation of the planetary transmission, the letter "X" indicating the servo member applied in each condition of transmission operation:

|         | Band 57 | Band 60 | Clutch 50-54 |
|---------|---------|---------|--------------|
| Neutral |         |         |              |
| Low     | X       |         |              |
| High    |         |         | X            |
| Reverse |         | X       |              |
| Park    |         |         |              |

The control system includes a manually operable selector valve 150 which may be positioned by the vehicle operator to select neutral, low range, high range, park, and reverse operation. With the valve 150 positioned for high range operation, the control system is initially conditioned to start the vehicle from a standing start in low gear and to provide for automatic upshift to direct drive through the planetary gearing upon a sufficient increase in vehicle speed. With the valve 150 positioned to select low range, reduction drive through the planetary gearing is maintained irrespective of vehicle speed. In addition, the control system includes mechanism operable by the vehicle driver for forcing a downshift from direct drive to reduction drive through the planetary gearing unit when desired and, in the embodiment of Figure 16, a manually operable overcontrol valve for maintaining direct drive in the planetary gearing unit.

*Manual selector valve*

As shown generally in Figure 6 and in greater detail in Figures 9 through 12, manually operable selector valve 150 is slidably positioned within a bore 151, the valve body being manually movable by the vehicle operator by means of the linkage mechanism (not shown) for selecting the condition of transmission operation. The valve bore is provided with nine ports numbered consecutively from the top to the bottom of the valve. Port 152 exhausts to transmission sump, 153 connects to reverse band apply passage 301, 154 is a pressure supply port for pump pressure feed line 300, 155 communicates with low band servo apply passage 302, 156 connects to shift valve pressure supply passage 303, 157 exhausts to the transmission sump, 158 connects with main line pressure supply passage 300, 159 communicates with accumulator pressure feed passage 304, and 160 exhausts to transmission sump. The manual selector valve 150 is shown positioned for drive range in Figure 6, low range in Figure 9, neutral in Figure 10, park in Figure 11, and reverse in Figure 12.

*Automatic valves*

In Figure 6, in general, and in Figure 7 in detail, there is shown a group of control valves including a so-called throttle valve or T-V valve 162, a so-called detent or kickdown or forced downshift valve 177, a shift valve 190, and a pressure limiting valve 197. A vehicle speed responsive governor 219 is shown in general in Figure 6 and in detail in Figure 8.

Throttle valve

Referring particularly to Figure 7, the throttle or T-V valve includes a stem portion 161 and a valve body 162, both slidably positioned in a bore 163 in valve casing 164. Stem 161 extends outwardly from valve casing 164 to contact the edge surface of a cam 240 and is provided with a cup-shaped recess at the opposite end for receiving one end of a spring 168. The valve body 162 includes a pair of lands 165 and 166 joined by a reduced stem portion 167, the land 165 having a cup-shaped recess in one end thereof for receiving the opposite end of spring 168. Bore 163 is provided with five ports 169, 170, 171, 172 and 173. Port 169 exhausts to the transmission sump, 170 connects to the throttle valve (T-V) delivery passage 305. 171 communicates with port 173 by way of passage 174, 172 is a pressure supply port from pump line pressure supply passage 300, and 173 admits pressure from passage 174 to chamber 175 beneath one end of land 166.

Detent valve

Slidably positioned in a bore 176 of casing 164 is a so-called detent or forced downshift valve 177, the valve including a stem 178 extending outwardly from casing 164 and adapted to contact surface 244 of cam 240 as hereafter explained more fully. A pin 179 extending within recess 180 limits the permissible movement of the valve within the bore. The valve body includes a pair of lands 181 and 182 joined by reduced stem 183, the land 182 being formed with a hollow cup-shaped recess for receiving one end of a spring 184. The opposite end of the spring seats against one end of the valve bore. The valve bore is provided with four ports, 185, 186, 187, and 188. Port 185 exhausts to the transmission sump, 186 connects to delivery passage 306, port 187 connects to T-V pressure delivery passage 305, and port 188 communicates with direct drive clutch apply passage 307. Low band servo release passage 308 of Figure 6 is in series with passage 307, being supplied with fluid pressure whenever pressure is supplied to passage 307 to apply the clutch.

Shift valve

Slidably positioned within a bore 189 in casing 164 is a shift valve 190, the shift valve body being formed of spaced lands 191 and 192 joined by reduced stem 193. A piston 194 slidably positioned in an enlarged bore portion is fastened to one end of land 191, the piston having an axially protruding nipple 195 extending therefrom. A pressure limiting valve 197 is slidably positioned within the bore and yieldably biased away from nipple 195 by means of a spring 198. A second spring 199 is positioned between the casing and piston 194 for yieldably biasing the valve to the position illustrated in Figures 6 and 7. The valve assembly is provided with eight ports, 200, 201, 202, 203, 204, 205, 206, and 207. Port 200 connects to the T-V valve pressure delivery port 170 by way of passage 305. Port 201 is adapted to connect chamber 208 to chamber 209 when the valve 197 is forced down to compress spring 198 through action of throttle valve pressure in chamber 208. Port 202 communicates with downshift valve port 186 by way of passage 306. Port 203 connects to governor pressure delivery passage 309. Port 204 is connected to port 156 of manually operable selector valve 150 by way of passage 303. Port 205 connects to direct drive clutch apply passage 307 and to port 188 of downshift valve 177 by way of passage 307. Port 206 exhausts to the transmission sump and port 207 connects to a governor pressure delivery passage 309. It will be noted that the diameter of land 191 is greater than that of land 192. Because of the differential area of the two lands, fluid pressure admitted to passage 307 when the valve is moved for direct drive will react upon the shift valve tending to maintain the valve in its direct drive position. Thus, the planetary gearing unit will remain in direct drive at relatively lower vehicle speeds than the vehicle speeds required for upshifting the valve to its direct drive position. Examples of upshift and downshift vehicle speeds for various throttle openings are set forth in the table hereafter included with this specification.

Governor

The governor indicated generally by reference 210 of Figure 8 is made up of a casing 213 bored as indicated at 212 to receive a sleeve 212a extending into and carried by casing 213. A valve member indicated generally at 211 is positioned within the casing sleeve 212a, being formed of spaced lands 214 and 215 joined by a reduced stem portion 216. An axial bore 217 extends through land 214 to admit fluid pressure from the governor delivery or control line 309 to a chamber 218 at the end of the valve bore. A plunger 219 is slidably positioned in bore 212, the plunger being moved inwardly into the bore against the end of land 215 by means of a two stage flyweight mechanism hereafter described. It will be understood, of course, that the plunger and valve may be constructed as an integral unit if desired.

A sleeve member 224 is mounted upon sleeve 212a for rotation with respect thereto, sleeve 224 being formed with a flange 225 and an extension 225a for supporting the governor flyweight mechanism for rotation about the axis of valve 211. Sleeve 224 may be rotated by means of a drive chain sprocket 225b fixed to sleeve 224 and may be driven by a sprocket chain extending to drive sprocket 63 shown in Figures 8 and 1. On the other hand, the governor rotating parts may be driven through gearing (not shown) if desired. Thus, the speed of rotation of sleeve 224 is a function of vehicle speed.

A pair of governor weights 226 and 227 are pivotally mounted upon extension 225a of sleeve 224 by means of pins 222 and 223. Weighted lever elements are likewise mounted for pivotal motion upon pins 222 and 223, respectively. Weighted lever elements are made up of weighted portions 230 and 231, respectively, and lever arms 220 and 221, respectively, the lever arms being effective to apply a force to valve 211 tending to move the valve toward a position to increase the governor delivered pressure upon a rise in speed of rotation of the sleeve 224. Flange 225 carries a stop member 225c adapted to limit the permissible outer movement of weights 226 and 227 about their pivotal axis. Cup members 226a and 227a are carried by weights 226 and 227, respectively, to receive springs 228 and 229, respectively, positioned between weights 226—230 and 227—231, respectively.

The governor bore is provided with ports 232, 233 and 234. Port 232 connects to governor pressure supply passage 300. Port 233 connects to governor delivery or control passage 309, and port 234 exhausts to the transmission sump. The position of valve 211 in the bore 212 is determined by the opposing forces of fluid pressure in chamber 218 tending to move the valve to open exhaust port 234 and the force of levers 220 and 221 tending to move the valve to block off exhaust port 234 and to connect ports 232 and 233. Governor delivery pressure in control line 309 is conducted to one end of land 192 and to chamber 209a at one side of piston 194 of the shift valve as shown in Figure 7, the governor pressure tending to upshift the valve for direct drive through the planetary gearing unit.

Due to the employment of stop member 225c on flange 225, the governor provides a two stage pressure delivery upon increase of vehicle speed. In the initial stage, relatively heavy weights 226 and 227 are most effective in applying force to valve 211. After weights 226 and 227 have pivoted in a clockwise direction about pins 222 and 223 to their maximum outer permissible position wherein stop 225c contacts the weights, the lighter weights 230 and 231 may continue to rotate clockwise about pins 222 and 223 to increase the force on valve 211 with further increase in vehicle speed. As shown in Figure 8, the heavy weights extend into a recess between the base of flange 225 and the stop member 225c. As an alternative construction, flange 225 could be formed as a plate having a window through which one end of the weights extends.

The operation of the valve mechanism of Figure 7 will now be more particularly explained. As shown in Figure 7, cam 240 is positioned for rotation about shaft 241, the cam having an edge surface 242 of compound curvature for progressively forcing stem 161 into casing 164 as the vehicle accelerator pedal is forced down to open the engine throttle. The cam may be connected to the accelerator pedal by any suitable linkage, not shown. The cam surface also includes a portion 243, constituting the arc of a circle adapted to contact stem 161 and a generally straight planar surface 244 for forcing the detent valve stem 178 into the casing 164.

Pump line pressure is supplied to port 172 of the throttle or T–V valve 162 by way of supply passage 300. With the vehicle accelerator pedal fully retarded, the cam is positioned as shown in Figures 6 and 7, stem 161 fits in recess 245 of cam 240, and land 166 is positioned to block off port 172. No T–V pressure will be delivered by the T–V valve. As cam 240 is rotated by shaft 241 in response to depression of the vehicle accelerator pedal to open the engine throttle, stem 161 will be moved into the valve bore, thereby loading spring 168 and forcing the land 166 to uncover port 172 and admit pressure to passage 305. At the same time, pressure is admitted to chamber 175 by way of passage 174, this pressure acting on the end of land 166, tending to move the valve body against spring 168 to cut off port 172. The pressure level delivered by the T–V valve is therefore a metered pressure which increases in accordance with the degree of engine throttle opening, the pressure being determined by the angular rotation of cam 240 to force stem 161 into the bore 163. The T–V pressure delivered by the T–V valve is conducted to port 187 of detent valve 177 and to port 200 and chamber 208 above pressure limiting valve 197. This T–V pressure may vary between zero and supply line pressure, depending upon the degree of throttle opening.

T–V pressure in chamber 208 is effective to move valve 197 to compress spring 198, the valve 197 assuming a position wherein T–V pressure from chamber 208 is admitted to chamber 209 by way of port 201, the valve 197 blocking off port 202 when port 201 is opened. It will be noted that the pressure areas at opposite ends of the valve 197 are equal, but that the right hand end of valve 197 is acted upon by spring 198. The spring will therefore be effective to move the valve to uncover port 202 and to block off port 201. Pressure in chamber 209 is therefore exhausted by way of port 202, passage 306 and ports 186 and exhaust port 185 of the detent valve. As soon as the effect of pressure in chamber 208 is equal to the sum of effect of fluid pressure in chamber 209, plus that of spring 198 acting on the opposite end of the regulator valve 197, the valve seeks a balance wherein ports 201 and 202 are cut off by the valve. Thus, the actual pressure maintained in chamber 209 is less than the pressure delivered by the T–V valve 162, as determined by the force of spring 198. This modified pressure level maintained in chamber 209 is preferably about nine and one-half pounds less than the pressure level of the T–V output pressure delivered to passage 305. This will be true even with full engine throttle opening, before the detent valve is actuated by cam 240.

For manual vehicle operation, the modified T–V pressure in chamber 209 tending to downshift the shift valve 190 to low gear ratio operation and the governor pressure acting in chambers 209a and 207 are effective to cause shifting of valve 190, depending upon vehicle speed and engine throttle setting as follows:

| Throttle opening | Vehicle speed, M. P. H. | Upshift | Downshift |
| --- | --- | --- | --- |
| Closed | 13 | X | |
| Closed | 11.5 | | X |
| Half (35°) | 16 | X | |
| Half (35°) | 12 | | X |
| Full | 30 | X | |
| Full | 16.5 | | X |

After full engine throttle opening is obtained and full T–V pressure is delivered to passage 305, cam 240 may be rotated further by depressing the vehicle accelerator pedal past its fully open throttle position to a so-called detent or forced downshift position for obtaining forced downshift to low gear ratio. In the detent position, surface 244 of cam 240 forces stem 178 of the detent valve 177 into the casing, thereby causing land 181 to cut off exhaust port 185, and land 182 to admit full T–V pressure from passage 305 to chamber 199 by way of passage 306. The total pressure acting upon piston 194 tending to downshift valve 190 for low gear ratio operation is approximately nine and one-half pounds greater than is the case of normal full throttle vehicle operation. With the cam positioned for detent operation, shifting occurs as follows:

| Throttle opening | Vehicle speed, M. P. H. | Upshift | Downshift |
| --- | --- | --- | --- |
| Detent | 40 | | X |
| Detent | 45 | X | |

Thus, with the vehicle accelerator pedal positioned for detent operation, the planetary gearing will shift into low gear ratio at vehicle speeds below 40 miles per hour and will remain in low gear ratio until a vehicle speed of 45 miles per hour is obtained. This speed range of shift may be varied as desired by calibrating spring 198 to achieve the desired speed ranges of shift. The forced downshift of the planetary gearing is particularly useful for emergency conditions which may be encountered during operation of the vehicle at relatively low speeds, and particularly where more rapid acceleration than that normally obtained in direct drive is desired.

*Pressure regulator valve*

As shown in Figure 6, a pressure regulator valve 250 is provided to control oil pressures in the hydraulic system and to adjust the pressure of oil fed to the torque converter. The valve 250 is slidably positioned in a bore 251 and includes lands 252, 253, 254 and 255, the land 252 being of greater diameter than the other lands of the valve. The casing 256 is provided with seven ports, 257, 258, 259, 260, 261, 262, and 263. Port 257 admits pump line pressure from low band servo release passage 308 to the bore beneath land 252. This pressure acting upon the bottom of land 252 tends to raise the pressure regulator valve in the valve bore when the transmission is conditioned for direct drive, the pressure feed to port 257 being controlled by shift valve 190. More specifically, line pressure is directed to port 257 by way of direct drive clutch apply passage 307, controlled by shift valve 190, and by way of low band release passage 308. Thus, even though manually operable selector valve 150 may be positioned for drive range operation, no pressure will be supplied to port 257 until shift valve 190 is positioned for direct drive. The arrangement, therefore, constitutes a device controlled by the shift valve for modifying the line pressure upon accomplishing shift in the planetary gearing unit. In reduction drive the pressure level of the line pressure is greater than that maintained in direct drive.

Port 258 communicates with the rear pump suction passage 310. Port 259 communicates with passage 311 leading to port 320 of check valve 321. Port 260 connects to front pump pressure delivery passage 312. Port 261 admits pressure to the converter supply passage 313. Port 262 admits line pressure from pump supply passage 300 to the valve bore intermediate lands 254 and 255. Port 263 admits line pressure from pump supply passage 300 to the valve bore beneath land 255. The pump line pressure acting upon the bottom of land 255 tends to move the pressure regulator valve upwardly in the valve bore. Upward movement of the valve is resisted by a spring 264. Rear pump delivery passage 314 terminates at port 321 of double check valve 340.

As the pumps supply fluid pressure to port 263 of pressure regulator valve 250, the oil pressure acting beneath land 255 increases until the force of spring 264 is overcome, and port 261 to the converter feed line 313 is uncovered by movement of the valve. Also uncovered is port 258 leading to pump suction passage 310. The valve then moves back and forth, as required to maintain the desired oil pressure. Lubrication oil is supplied to the transmission by way of passage 315 leading from the torque converter.

The pressure level of the system is modified in order to adjust the system pressure in acordance with variation of engine torque by means of a modulator 270 shown in Figures 6 and 13. The outer end of the pressure regulator valve 250 extends into the modulator casing 271 to contact the modulator control lever 272 mounted for rotary motion about a support pin 273. The modulator is made in two sections, one of which is actuated by vacuum, and the other by hydraulic pressure. The vacuum modulator acts to impose additional resistive force on the pressure regulator valve 250 to increase the oil pressure of the control system when high torque is being transferred. In addition it removes this additional resistive force to permit lower system oil pressure when less torque is being transferred.

The hydraulic modulator, on the other hand, adds resistance to pressure regulator valve movement, to increase the system oil pressure without regard for variations in the amount of torque being handled by the transmission. The vacuum modulator is provided principally for direct drive through the planetary gearing, while the hydraulic modulator is used only for low and reverse. The hydraulic modulator is controlled by the manual valve 150 independently of shift valve 190, and is effective only when the manual valve is positioned for low range or reverse operation. Thus, if the manual valve is positioned for drive range operation, the hydraulic modulator will be ineffective even though the shift valve 190 is positioned for low gear operation of the planetary unit. Specifically, with valve 150 positioned for drive range operation, hydraulic modulator pressure supply passage 304 is exhausted through port 160 of valve 150.

The vacuum modulator is made up of a coil spring 274 confined between the modulator cover 275 and a diaphragm 276. A passage 316 connects to the vehicle engine intake manifold as a source of vacuum. Engine vacuum, acting on diaphragm 276 adjusts the effective force of spring 274 applied to modulator control lever 272 and hence to regulator valve 250. As engine vacuum increases, as at part throttle, the spring load is progressively removed from arm 272. Spring force is transferred from diaphragm 276 to modulator control lever 272 by means of pistons 277 and 278, one sliding inside the other. Piston 277 is fitted into the modulator housing and contacts the diaphragm 276. Piston 278 rides upon modulator control lever 272. Openings 279 and 280 in the piston side walls admits oil under pressure from passage 304, this pressure being controlled by port 159 of manual valve 150 and admitted to passage 304 only when the manual valve 150 is positioned for low, park, or reverse operation. When the assembly is expanded, as in low or reverse setting of manual valve 150, the hydraulic modulator pushes diaphragm 276 of the vacuum modulator outward against spring 274, until it strikes cover 275. The force of the expanded hydraulic unit acts on the end of pressure regulator valve 250 through modulator control lever 272, causing the pressure level of the pressure in the control system to be raised.

During vacuum modulation, as when the manual valve is positioned for drive range, ports 159 and 160 of manual valve 150 exchaust pressure from the modulator to the transmission sump so that no oil pressure exists in the hydraulic modulator. Pistons 277 and 278 slide together and act as a solid link between diaphragm 276 and modulator control arm 272.

An accumulator 280 is connected to port 159 of manually operable control valve 150 by way of passage 304. The accumulator is used only in low range and reverse setting of manual valve 150 to supply oil pressure to the hydraulic modulator by way of passage 304. With the manual valve positioned to park, supply passage 300 is connected to passage 304, but this has no effect since the engine is turned off and the pump stopped. When the manual valve 150 is moved from drive range to low range operation, the accumulator acts as a surge chamber, retarding the sudden rise of oil pressure, and cushioning the application of the low gear band 57.

Details of the accumulator are illustrated in Figure 13. The accumulator 280 is formed of a casing 281 forming a cylindrical chamber 282 in which is positioned a piston 283 spring loaded by a spring 284. A stop ring 285 limits the permissible upward movement of piston 283. Casing 281 terminates in an annular valve seat 286, there being a cover member 297 screwed upon casing 281 for adjustment with respect to the casing. A check valve 287 having a restricting orifice 288 extending therethrough is spring loaded by a spring 289 for seating upon valve seat 286. A cup member 290 welded to check valve 287 supports a spring 291 positioned for loading a second check valve 292 to yieldably bias valve 292 for seating upon an annular boss 293 formed upon check valve 287. An opening 294 is formed in the bottom of cup member 290.

With manually operable valve 150 positioned in low range or reverse setting, fluid pressure is admitted to chamber 295 by way of passage 304. This pressure passes through restrictor orifice 288 unseating check valve 292 from boss 293, thereby building up pressure in chamber 296, forcing piston 283 to compress spring 284. The orifice 288 and check valve 292 cooperate to restrict the rate of pressure build-up in chamber 296, the piston 283 functioning in cooperation with the orifice and check valve 292 to prevent pressure surges and restrict the rate of pressure build-up.

When manual valve 150 is positioned for drive range, park or neutral, passage 304 is exhausted to the transmission sump by way of ports 159 and 160 of the manual valve. Pressure from the hydraulic modulator will act upon check valve 287, lifting the valve from seat 286 thereby permitting a relatively unrestricted and rapid exhaust of modulator pressure. It will be noted that the discharge area of check valve 287 is greater than that of check valve 292. In supplying pressure to the modulator, restrictive orifice 288, check valve 292 and piston 283 all combine to limit the rate of pressure build-up. In discharging pressure from the modulator, piston 283, loaded by spring 284, and the relatively large discharge area of check valve 287 combine to permit rapid exhaust of fluid pressure from the modulator.

A pressure relief valve 297, shown in Figure 6, limits the maximum pressure obtainable in the system.

Figure 15:
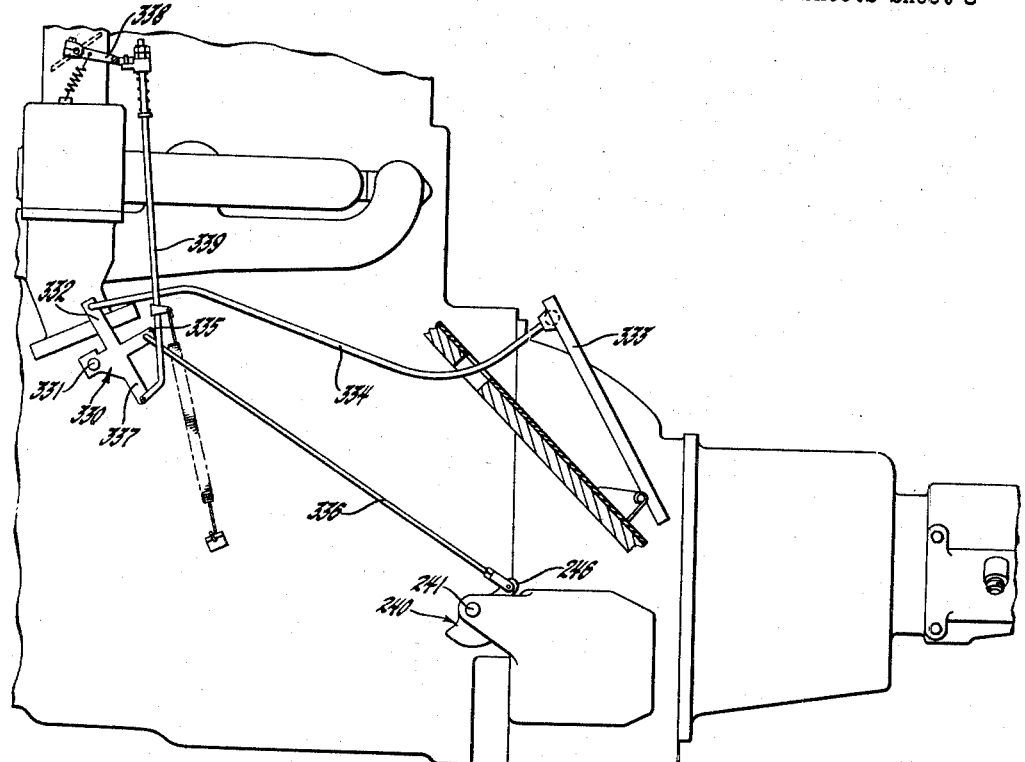
Figure 15 illustrates the throttle control for operating the cam of Figures 6, 7 and 14.
Figure 14:
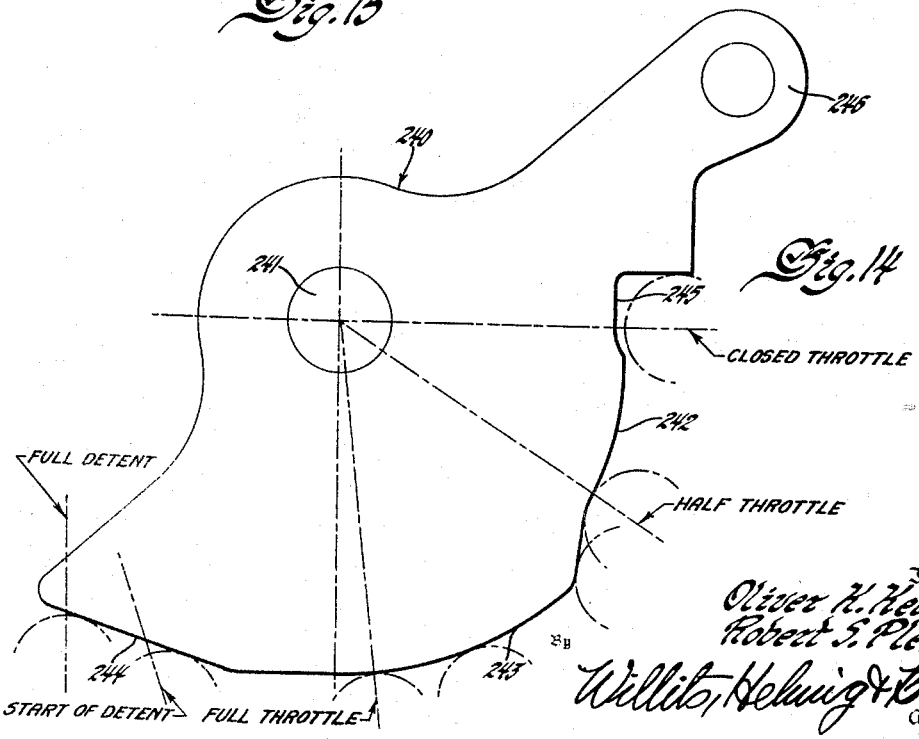
Figure 14 is an enlarged view of the cam for actuating the throttle valve and detent valve of Figures 6 and 7.

Referring now to Figure 15, there is shown a linkage for rotating cam 240 about axis 241. A lever 330 mounted for pivotal rotation about shaft 331 includes an arm 332 operatively connected to the vehicle accelerator pedal 333 by means of link rod 334, an arm 335 operatively connected to arm 246 of cam 240 by means of rod link 336, and an arm 337 connected to the engine throttle control lever 338 by means of rod link 339. Depression of the vehicle accelerator pedal rotates lever 330 counterclockwise about shaft 331, the link 339 causing the carburetor throttle valve to open and link 336 rotating cam 240 about support shaft 241. The lengths of arms 335 and 337 are chosen to provide for full carburetor throttle opening before surface 244 of cam 240 is positioned to the so-called detent position wherein the detent valve 177 is moved to the forced downshift position.

*Fluid pressure supply*

Engine driven pump P and vehicle drive shaft driven pump Q, shown in Figure 6, are used to supply fluid pressure to the control system and to the torque converter. With the engine started and the vehicle standing still, pump P supplies the entire requirements of the system. At vehicle speeds above approximately 15 miles per hour, pump Q supplies the entire requirements of the system.

Pump P draws fluid from the transmission sump by way of suction passage 310a, delivering pressure fluid to port 260 of pressure regulator valve 250. Spring 264 initially loads valve 250 so that fluid pressure is admitted to port 259 and passage 311 leading to port 320 of double check valve 340. This pressure will move spring arm 341 away from port 320 and cause spring arm 342 to block off port 321 of the double check valve. Fluid pressure will be admitted to passage 300, reacting upon land 255 of the regulator valve 250, supplying pressure fluid to ports 154 and 158 of the manual valve 150, and supplying line pressure to port 172 of T-V valve 177 and port 232 of governor 219. At vehicle speeds above approximately 15 miles per hour, pressure supplied by rear pump Q to passage 314 will force arm 342 of the double check valve away from port 321 and cause arm 341 to block off port 320. Line pressure acting beneath land 255 will serve the pressure regulator valve up against spring 264, thereby connecting front pump P delivery passage 312 to rear pump Q suction line 310 by way of port 258.

Fluid pressure supplied to the torque converter by way of passage 313 is permitted to escape from the torque converter by way of passage 315, this pressure being supplied to axial bores 65a and 21a of shafts 65 and 21 (see Figures 1 and 6) for lubrication purposes. A series of radial passages in shafts 65 and 21 communicate with the axial passages 65a and 21a to admit lubrication fluid to the transmission.

*Operation—Drive range*

With the manual valve 150 positioned for drive range operation as illustrated in Figure 6, fluid pressure from pressure supply passage 300 is admitted to low gear servo band apply passage 302 by way of ports 154 and 155 of the manual valve, this pressure acting upon piston 96, causing the piston to compress release spring 99 and apply band 57 to drum 49. The shift valve 190 is initially positioned for low gear operation as illustrated in Figure 6. Low band release passage 308 is exhausted to the transmission sump by way of passage 307 and ports 205 and 206 of the shift valve 190 (see Figure 7).

With the engine idling, the torque converter provides sufficient internal slip to permit the vehicle to remain standing still even though band 57 is applied for low gear operation. As the engine is speeded up, the converter drives the vehicle, thereby causing the governor to deliver governor pressure to ports 203 and 207 of shift valve 190 by way of passage 309. At some vehicle speed, depending upon the metered T-V pressure delivered through passage 305 as heretofore explained, governor pressure will be effective to cause the shift valve to upshift for direct drive. With the shift valve 190 positioned for direct drive, land 192 blocks off exhaust port 206 and land 191 admits line pressure from passage 303 to direct drive clutch apply passage 307. Low band release passage 308, in series with passage 307, is likewise supplied with line pressure, this pressure acting upon piston 96 in assistance to release spring 99 being sufficient to release the low band irrespective of the effect of pressure in low band apply passage 302. It will be noted that low band release passage 308 supplies pressure to port 257 of pressure regulator valve 250, this pressure reacting upon land 252 of the pressure regulator valve causing the valve to diminish the line pressure when direct drive is called for. This permits smooth engagement of the clutch plates and eliminates jar and shock as shifting is achieved. As heretofore stated, land 252 is of greater diameter than land 253, so that a force is exerted upon valve 250 tending to diminish the line pressure because of these differential areas.

The forced downshift obtainable from direct drive to low gear drive with the manual valve positioned for drive range operation has heretofore been explained and needs no further consideration.

It will be noted that with the manual valve positioned for direct drive the hydraulic modulator supply passage 304 is exhausted to the transmission sump by way of ports 159 and 160 of the manual valve. Thus, in direct drive the hydraulic modulator is ineffective and line pressure is varied through action of the vacuum modulator alone.

*Operation—Low range*

With the manual valve positioned for low range operation as illustrated in Figure 9, shift valve pressure supply passage 303 is exhausted to the transmission sump by way of port 156 and exhaust port 157 of manual valve 150. Shift valve 190, therefore, is unable to deliver pressure fluid to direct drive clutch apply passage 308 and low band release passage 307 in its upshift position. Low band apply passage 302 is supplied with pressure from pressure supply passage 300 by way of ports 154 and 155 of manual valve 150. Thus, with the manual valve 150 positioned for low range operation the band 57 remains applied to drum 49 irrespective of vehicle speed. Low range is useful for purposes of engine breaking as in descending a steep slope or in pulling heavy loads. As heretofore explained, the hydraulic modulator supply passage 304 is connected with line pressure in passage 300 by way of ports 158 and 159 when the manual valve 150 is positioned for low range operation. The hydraulic modulator is effective when supplied with fluid pressure to force the pressure regulator valve downwardly for increasing the line pressure and thus insuring that band 57 will grip drum 49 with sufficient force to prevent slipping of the band on the drum irrespective of the effect of the vacuum modulator.

*Operation—Neutral*

The manual valve 150 is illustrated as positioned for neutral operation in Figure 10. With the valve thus positioned, low band apply passage 302 and shift valve supply passage are exhausted to sump by way of port 157 of the manual valve. Reverse band apply passage 301 is exhausted to sump by way of port 152 of the manual valve. Direct drive clutch apply passage 307 is exhausted to sump by way of either passage 303 if the shift valve is positioned for direct drive or exhaust port 206 when the shift valve is positioned for low range drive. With the reverse band, low band, and direct drive clutch passages exhausted, both bands and the clutch are released so that no torque can be transferred through the planetary gearing.

*Operation—Reverse*

With the manual valve 150 positioned for reverse operation as illustrated in Figure 12, reverse band apply passage 301 is supplied with line pressure from supply passage 300 by way of ports 154 and 153 of the manual valve, this pressure acting in chamber 79 to force piston 80 to apply band 60 to reverse drum 59. As was the case in the reverse setting of the manual valve, the hydraulic modulator is supplied with pressure fluid from passage 300 by way of ports 158 and 159 and hydraulic modulator supply passage 304. The action of accumulator 280 in line 304 has heretofore been explained. Thus, in reverse, as well as in low, the hydraulic modulator acts to raise the pressure level in the control system to a higher pressure than that prevailing in direct drive. This prevents slipping of band 60 on reverse drum 59 irrespective of the torque load being transferred. With the manual valve positioned for reverse, low band apply passage 302 and shift valve supply passage 303 are exhausted to the transmission sump by way of manual valve exhaust port 157. Thus it is impossible for either low band 57 or the direct drive clutch to be applied when the manual valve 150 is positioned for reverse.

*Operation—Park*

The manual valve is positioned for park in Figure 11. With the manual valve thus positioned, pump pressure discharge in supply line 300 is exhausted to sump by way of ports 154 and 152 of the manual valve, there being no pressure available for actuating either the low band, reverse band, or direct drive clutch.

There has been described in this specification a novel control system for a transmission having a plurality of drive trains for operatively connecting a power and a load shaft including low gear, direct drive, and reverse. The manual valve 150 is effective to deliver fluid pressure to the low band apply servo in both its drive range and low range position and is controlled by the vehicle operator by suitable linkage not shown. The direct drive clutch control chamber and the reduction gearing release chamber are connected in series so that the reduction band 57 is released when fluid pressure is admitted to the direct drive clutch apply chamber. The arrangement of the manually operable pressure metering valve 162, detent valve 177, pressure limiting valve 197 and shift valve 190 is novel and useful. As explained in detail, valve 197 automatically controls ports 201 and 202 to limit the pressure level of fluid pressure in chamber 209 of the shift valve to a lesser pressure than that being delivered by valve 162 to passage 305. The pressure in chamber 209 is preferably normally maintained at approximately nine and one-half pounds per square inch less than that in passage 305. When, however, an emergency condition arises in which the vehicle operator requires more rapid vehicle acceleration than that normally obtainable with the transmission operating in direct drive, forcing the accelerator pedal to open throttle position moves the detent valve to admit full metered pressure from valve 162 to chamber 209 by way of passage 306. Thus, under normal vehicle operation, passage 306 and valve 177 act as an exhaust port for chamber 209, under control of valve 197 for limiting pressure in chamber 209. When, however, valve 177 is moved inwardly by cam 240, passage 306 becomes the pressure delivery passage for admitting full delivery pressure from valve 162 to chamber 209. The valve 177 thereby by-passes pressure limiting valve 197 when forced downshift to reduction gearing is required.

It is well known that torque converters are most inefficient at low vehicle speeds or heavy load conditions wherein maximum torque multiplication is obtained within the torque converter. By providing the gearing arrangement and control system heretofore described, torque multiplication is initially obtained both in the torque converter and reduction gearing. The torque converter is therefore permitted to more quickly assume its function as a simple fluid coupling acting without torque multiplication, thus reducing fuel consumption. The automatic control system for initially starting the gearing in reduction drive and automatically upshifting to direct drive cooperates with the torque converter to provide for rapid vehicle acceleration and economy of operation.

Figure 16:
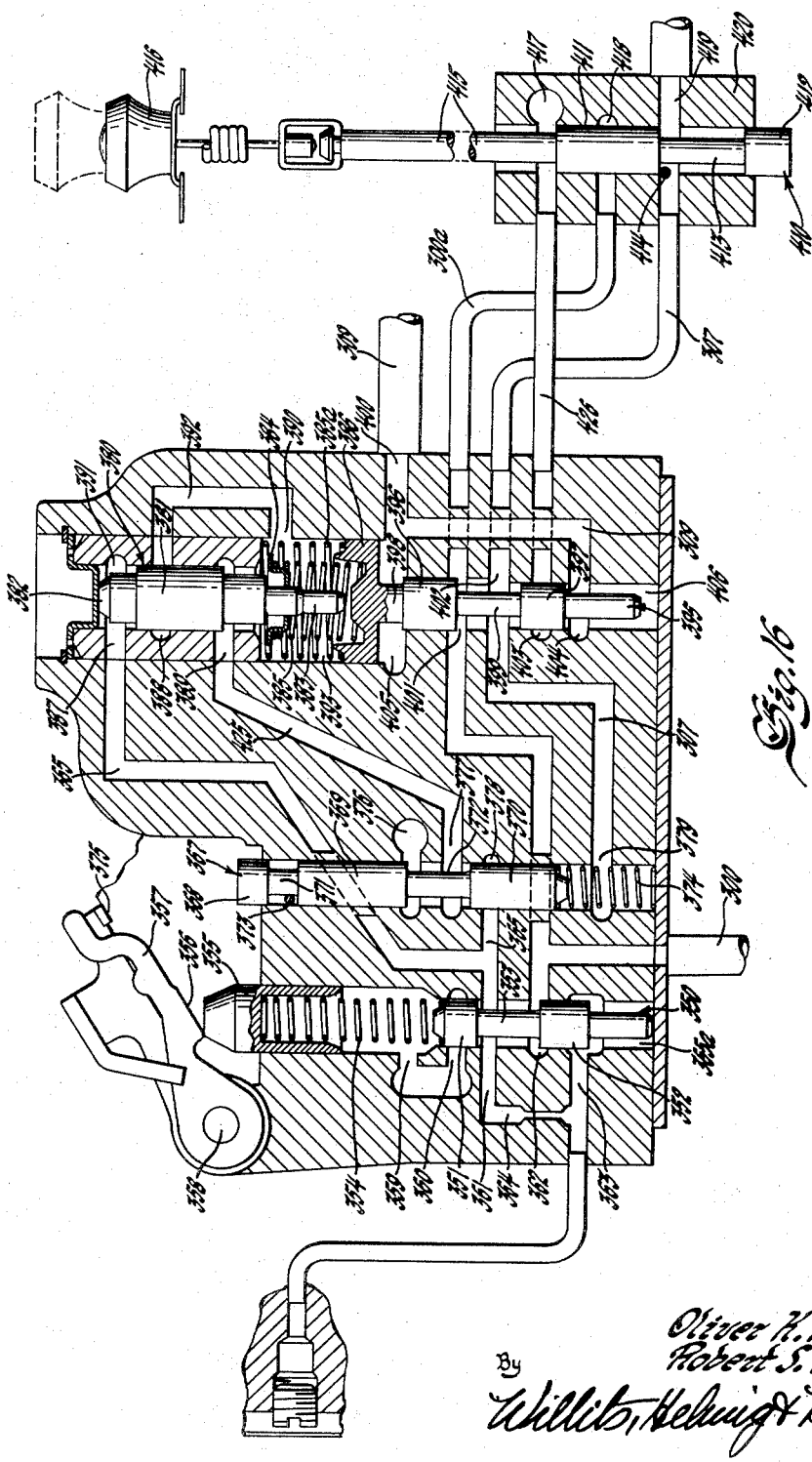
Figure 16 is a schematic diagram of an alternative form of control valving which may be substituted for the control valving of Figure 7.

Referring to Figure 16, there is shown a schematic diagram of a modified embodiment of the control valving of Figure 7 incorporating a pair of cams or levers for actuating the throttle valve and forcing downshift valve, and also incorporating a manually operable selector valve for rendering the automatic shift control of the planetary unit either operative or inoperative.

The control valving of Figure 16 includes a throttle or so-called T–V valve 350, a forced downshift valve 367, a shift valve 395, and a manually operable overcontrol valve 410 for rendering the automatic shift valve operative or inoperative.

Throttle valve 350 includes a pair of lands 351 and 352 joined by stem 353. A spring 354 bears upon the end of land 351 and is positioned within a cup member 355, member 355 in turn contacting cam surface 356 of lever 357 fixed to a shaft 358. Five ports, 359, 360, 361, 362 and 363, are associated with the throttle valve 350. Ports 359 and 360 exhaust to the transmission sump. Port 361 delivers variable throttle valve pressure to passage 364 and chamber 365a. Port 362 admits line pressure from main pressure supply passage 300 to port 361. Port 363 admits variable T–V pressure from passage 364 to chamber 365a beneath land 352.

Forced downshift valve 367 is formed of lands 368, 369 and 370 joined by stems 371 and 372. A stop pin 373 intermediate lands 368 and 369 limits the range of movement of valve 367. A spring 374 yieldably biases valve 367 to its upper limit of movement wherein pin 373 contacts the end of land 369. Valve 367 is adapted to be controlled by a lever 375 fixed to shaft 358. Four ports, 376, 377, 378 and 379, are associated with valve 367. Port 376 exhausts to the transmission sump. Port 377 connects to passage 425. Port 378 connects to throttle valve delivery passage 365 and port 379 connects to clutch supply passage 307.

The shift valve assembly is made up of a pressure regulator valve 380 and shift valve 395. Pressure regulator valve 380 is composed of a land 381 having reduced stem portions 382 and 383 extending outwardly from the opposite ends of the land. A spring retainer 384 carried by stem 383 abuts against one end of a spring 385, the opposite end of spring 385 contacting piston 386. Four ports, 387, 388, 389, 390, are associated with pressure regulator valve 380. Port 387 admits throttle valve pressure from passage 365 to chamber 391 above land 381. Port 388 admits pressure from chamber 391 to passage 392. Port 389 communicates with port 377 of downshift valve 367 by way of passage 425, and port 390 communicates with passage 392 to admit pressure in passage 392 to chamber 393. Shift valve 395 includes a pair of lands 396 and 397 together with piston 386 joined as a unit by stems 398 and 399. Five ports, 400, 401, 402, 403 and 404, are associated with the shift valve and piston. Port 400 admits governor delivered pressure from passage 309 to chamber 405 beneath piston 386. Port 401 permits main line pressure in passage 300 to pass around land 396 to enter passage 300a even when the shift valve is in its "down" or low speed position. Port 401 also controls the admission of pressure fluid from main line pressure passage 300 to port 402 associated with high or direct drive clutch apply passage 307. Port 403 communicates with passage 426 leading to port 417 of downshift inhibitor valve 410. Port 404 admits governor pressure from passage 309 to chamber 406 beneath land 397.

Downshift inhibitor valve 410 is formed of lands 411 and 412 joined by stem 413. A stop pin 414 restricts the permissible range of movement of valve 410, the pin being disposed between the lands adjacent stem 413. A stem 415 extending outwardly from the valve casing 420 may be joined to a control handle 416 by any suitable linkage. Handle 416 is adapted to be mounted upon the vehicle instrument panel for manual operation by the vehicle driver. Three ports 417, 418 and 419 are associated with the valve casing. Port 417 exhausts to the transmission sump and connects to passage 426 leading to port 403 of shift valve 395. Port 418 connects to passage 300a which is supplied with pump line pressure at all times irrespective of the position of land 396 of shift valve 395. Port 419 connects to port 402 of shift valve 395 by way of passage 307.

*Operation of the control valving of Figure 16*

In the operation of the control valving of Figure 16, main pump line pressure from passage 300 is supplied to port 362 of throttle valve 350, to port 401 of shift valve 395 and to port 418 of downshift inhibitor valve 410 at all times. More specifically, port 401 permits line pressure from passage 300 to enter passage 300a both when shift valve 395 is in its "up" or direct drive position as illustrated and when the shift valve is in its "down" or gear reduction position wherein land 396 blocks off port 401 from port 402. That is, fluid pressure is permitted to pass around land 396 to enter passage 300a even when land 396 blocks off the passage of fluid from port 401 to port 402. Governor pressure for passage 309, which varies with vehicle speed, is admitted to chamber 405 beneath piston 386 and to the space beneath land 397, the governor pressure tending to move the shift valve to its direct drive position shown in Figure 16.

Throttle valve 350 operates in the same manner as the throttle valve 162 of Figure 7. That is, valve 350 seeks a position wherein the effect of pressure in chamber 365 balances the effect of spring 354 acting upon the valve. By depressing the vehicle accelerator pedal shaft 358 is rotated to force member 357 against member 355 to increase the effective force of spring 354 to thereby increase the pressure level of throttle valve pressure delivered to passage 365.

Throttle valve pressure acting in chamber 391 forces pressure regulator valve 380 against spring 385 tending to downshift the shift valve 395. In addition, fluid pressure is admitted by passage 392 to chamber 393 above piston 386, tending to downshift the shift valve. Pressure in chamber 393 is a modulated pressure, less than the pressure delivered by throttle valve 350. Land 381 seeks a position wherein the valve alternately cracks ports 388 to admit pressure to chamber 393 and cracks port 389 to permit exhaust of pressure from chamber 393 to exhaust port 376 of downshift valve 367 by way of passage 425.

When starting the vehicle from rest, governor pressure in passage 309 is initially zero and increases with vehicle speed. The shift valve is initially moved to its "down" or reduction drive position by the effect of springs 385 and 385a, throttle valve pressure acting upon valve 380, and modulated throttle valve pressure acting in chamber 393. With the shift valve in its "low" or reduction drive position, the direct drive clutch apply passage 307 is connected to exhaust through port 402, port 403, passage 426 and port 417 of downshift inhibitor valve 410. As the vehicle speed increases, governor pressure becomes effective to move the shift valve to its direct drive position illustrated wherein line pressure from passage 300 is admitted to direct drive clutch apply passage 307 by way of ports 401—402 of shift valve 395. Line pressure is also admitted to the chamber beneath downshift valve 367 by way of port 402, passage 307 and port 379 of the downshift valve.

It will be noted that the manually movable downshift inhibitor valve 410 controls the exhaust of pressure from direct drive clutch apply passage 307 when the shift valve 395 is in its "down" or reduction drive position. That is, line 307 exhausts by way of ports 402 and 403 of shift valve 395, passage 426, and exhaust port 417 of the downshift inhibitor valve 410. When the downshift inhibitor valve is positioned as shown in Figure 16, normal automatic shift may occur. When, however, the vehicle operator wishes to lock the planetary unit in direct drive, valve 410 is moved to block off port 417 and to open port 418 to 419, thereby admitting line pressure from pump delivery passage 300a to direct drive clutch apply passage 307. At the same time, line pressure is admitted to the chamber beneath downshift valve 367 by way of passage 307 and port 379. This pressure, acting upon land 370 of the downshift valve prevents downshift in the transmission, which otherwise could result through accelerator pedal action. It is often an advantage to operate the transmission gearing in direct drive even at low vehicle speeds. This is particularly true where starting under icy or other slippery road conditions where it is of advantage to limit the torque applied to the vehicle wheels.

When the downshift inhibitor valve 410 is positioned for automatic shift operation, the operator may cause forced downshift from direct to reduction drive by depressing the accelerator pedal past full engine throttle position to cause lever 375 to move valve 367 against spring 374 to admit throttle valve pressure from passage 365 to passage 425 by way of ports 378—377. This full throttle valve pressure entering chamber 393 through port 389 of the shift valve will cause downshift from direct to reduction drive at relatively high vehicle speeds. That is, governor pressure may be effective to overcome the effect of modulated throttle valve pressure in chamber 393 at a relatively low vehicle speed, but when full throttle valve pressure under control of valve 367 is admitted to chamber 393 of the shift valve 395, this full throttle valve pressure is effective to overcome the effect of governor pressure to cause downshift in the transmission at a relatively high vehicle speed.

The invention has been described in various forms which are intended to be explanatory, and not to be taken in any limiting sense, since various changes in ports, construction and arrangement may be effected without departing from the full intent and scope of the invention, as set forth in the appended claims.

We claim:

1. In a transmission control system for a vehicle transmission including hydraulically actuated mechanism for selectively providing reduction gearing drive or direct drive, servomotors for selectively actuating said reduction drive and direct drive mechanisms, respectively, a fluid pressure source, a manually operable selector valve for directing fluid pressure to said reduction gearing servomotor to apply the same, a hydraulically controlled shift valve effective in one position to select reduction drive and effective in a second position to select direct drive, a manually operable pressure metering valve for delivering variable metered pressure fluid to said shift valve, a pressure reduction valve between said pressure metering valve and said shift valve for reducing the pressure delivered to said shift valve, a second manually operable valve selectively operable to by-pass said reduction valve and deliver full metered pressure from said metering valve to said shift valve, and a governor responsive to vehicle speed for delivering variable metered pressure to said shift valve, said governor pressure and the pressure delivered by said manually operable pressure metering valve acting in opposition to each other to control said hydraulically actuated shift valve.

2. In a transmission control system for a vehicle transmission including hydraulically actuated mechanism for selectively providing reduction gearing drive or direct drive, a servomotor for actuating said direct drive mechanism, a servomotor for actuating said reduction gearing mechanism, a fluid pressure source, said reduction gearing servomotor having apply and release control chambers, a manually operable selector valve for controlling the admission of fluid pressure to said reduction gearing servo apply chamber, a hydraulically controlled shift valve effective in one position to select reduction drive and effective in a second position to select direct drive, a manually operable pressure metering valve for delivering variable metered fluid pressure to said shift valve for urging said shift valve toward its reduction drive position, a pressure reduction valve between said pressure metering valve and said shift valve for reducing the pressure delivered to said shift valve, an additional manually operable valve selectively operable to by-pass said reduction valve and deliver full metered pressure from said pressure metering valve to said shift valve for urging said shift valve toward its reduction drive position, and a governor responsive to vehicle speed for delivering a variable metered pressure to said shift valve, said governor delivery pressure being effective to urge said shift valve toward its direct drive position.

3. In change speed gearing controls for a vehicle transmission embodying a plurality of drive trains adapted to connect power and load shafts, one of which trains includes a reduction gearing torque coupling mechanism and another of which trains includes a direct drive coupling mechanism, a fluid pressure source, a fluid pressure responsive actuator for each of said mechanisms, the actuator for said reduction gearing mechanism having apply and release control chambers, respectively, and the actuator for said direct drive coupling mechanism having an apply control chamber, said last mentioned apply control chamber and said release control chamber being hydraulically connected in series, a manual valve for controlling the admission of fluid pressure from said source to said reduction gearing actuator apply chamber, a shift valve for controlling the admission of fluid pressure from said source to said direct drive actuator apply chamber and to said reduction gearing actuator release chamber, a pressure metering valve for delivering variable metered fluid pressure to said shift valve for selecting reduction gear drive through said transmission, a pressure limiting valve for limiting the pressure level of said metered pressure acting upon said shift valve, an additional manually operable valve selectively operable for raising the pressure level of the metered pressure acting upon said shift valve to a higher pressure level than that permitted by said pressure limiting valve, and a governor responsive to vehicle speed for delivering a variable metered pressure to said shift valve, said governor delivery pressure acting in opposition to said aforementioned metered pressure for positioning said shift valve for direct drive through said transmission.

4. In change speed gearing controls for a vehicle transmission embodying a plurality of drive trains adapted to connect power and load shafts, one of which trains includes a reduction gearing torque coupling mechanisms and another of which trains includes a direct drive coupling mechanism, a fluid pressure source, a fluid pressure responsive actuator for each of said mechanisms, the actuator for said reduction gearing mechanism having apply and release control chambers, respectively, and the actuator for said direct drive coupling mechanism having an apply control chamber, a manually operable valve movable to different positions for selecting drive range and low range of transmission operation, respectively, a shift valve for selecting direct drive or reduction drive through said transmission, said manual valve being effective in drive range to connect both said reduction drive actuator apply chamber and said shift valve to said fluid pressure source, said manual valve being effective in low range to connect said reduction drive apply chamber to said fluid pressure source and to connect said shift valve to exhaust, a pressure metering valve for delivering variable metered pressure to said shift valve for selecting reduction gear drive through said transmission, a pressure limiting valve for limiting the pressure level of said metered pressure acting upon said shift valve, an additional manually operable valve selectively operable for raising the pressure level of the metered pressure acting upon said shift valve to a higher pressure level than that permitted by said pressure limiting valve, and a governor responsive to vehicle speed for delivering a variable metered pressure to said shift valve, said governor delivery pressure acting in opposition to said aforementioned metered pressure for positioning said shift valve for direct drive through said transmission.

5. In change speed gearing controls for a vehicle transmission embodying a plurality of drive trains adapted to connect power and load shafts, one of which trains includes a reduction gearing torque coupling mechanism and another of which trains includes a direct drive coupling mechanism, a source of fluid pressure, a fluid pressure responsive actuator for each of said mechanisms, the actuator for said reduction gearing mechanism having apply and release control chambers, respectively, the actuator for said direct drive mechanism having an apply control chamber, passage forming means connecting said direct drive control chamber and said reduction drive release chamber in series, a manually operable valve movable to different positions to select drive range and low range operation of said transmission, a shift valve, a governor valve, a pressure supply passage from said fluid pressure source to said manual valve, a passage from manual valve to said reduction drive apply chamber, a pressure supply passage from said manual valve to said shift valve, a passage connecting said shift valve to said direct drive apply chamber, said manual valve being effective in its drive range position to connect said reduction gearing apply chamber and said shift valve supply passage to said fluid pressure source, said manual valve being effective in its low range position to connect said reduction gearing apply passage to said fluid pressure source and to connect said shift valve supply passage to exhaust, a pressure metering valve, a passage connecting said pressure metering valve and said governor valve to said fluid pressure source, a control chamber associated with said shift valve, a pressure delivery passage connecting said pressure metering valve and said shift valve control chamber, a pressure limiting valve for limiting the pressure level of the fluid pressure in said shift valve control chamber, an additional manual valve selectively operable for raising the pressure level in said shift valve control chamber to a higher pressure level than that permitted by said pressure limiting valve, an additional control chamber associated with said shift valve, and a pressure delivery passage connecting said governor valve to said additional control chamber for positioning said shift valve for direct drive through said transmission.

6. In change speed gearing for a vehicle transmission embodying a plurality of drive trains adapted to connect power and load shafts, one of which trains includes a reduction gearing torque coupling mechanism and another of which trains includes a direct drive coupling mechanism, a source of fluid pressure, a fluid pressure responsive actuator for each of said mechanisms, apply and release chambers associated with said reduction gearing actuator, an apply chamber associated with said direct drive actuator, a manual valve movable to different positions to select drive range and reduction range, respectively, of transmission operation, a shift valve, a passage connecting said reduction gearing release chambers and said direct drive actuator apply chamber in series, a passage connecting said shift valve to said direct drive actuator chamber, a governor valve responsive to vehicle speed, a manually operable pressure metering valve, a common passage for supplying fluid pressure to said manual selector valve, said manually operable pressure metering valve and said governor valve, a passage controlled by said manual selector valve for supplying fluid pressure to said reduction gearing apply chamber, a pressure supply passage controlled by said manual selector valve for supplying fluid pressure to said shift valve, said manual selector valve being effective in said drive range position to connect said reduction actuator apply chamber and said shift valve supply passage to said fluid pressure source, said manual selector valve being effective in said low range position to connect said reduction gearing actuator apply chamber to said fluid pressure source and to connect said shift valve supply passage to exhaust, a control chamber associated with said shift valve, a pressure delivery passage connecting said shift valve control chamber to said manually operable pressure metering valve, a pressure limiting valve in said last-mentioned pressure delivery passage for limiting the pressure in said shift valve control chamber, an additional manually operable valve, a passage between said last-mentioned valve and said shift valve control chamber, said additional manual valve being effective in one position to connect said passage to exhaust and effective in a second position to connect said passage to the pressure delivery passage of said manually operable pressure metering valve, a second control chamber associated with said shift valve, and a pressure delivery passage connecting said governor valve to said last-mentioned control chamber, said governor valve being effective to deliver metered fluid pressure varying in accordance with vehicle speed to said second shift valve control chamber for positioning said shift valve for direct drive operation of said transmission.

7. In change speed gearing controls for a vehicle transmission embodying a plurality of drive trains adapted to connect power and load shafts, one of which trains includes a reduction gearing torque coupling mechanism and another of which trains includes a direct drive coupling mechanism, a fluid pressure source, a fluid pressure actuator for each of said mechanisms, the actuator for said reduction gearing mechanism having a fluid pressure actuator chamber and a pressure release chamber, a manual valve movable to different positions for selecting drive range and low range, respectively, of transmission operation, a shift valve movable to different positions for selecting reduction drive or direct drive, a piston for controlling the position of said shift valve, control chambers at opposite sides of said piston, a pressure metering valve for supplying fluid pressure which varies in accordance with engine torque to one of said control chambers, valve means for limiting the pressure level of the metered pressure in said one control chamber to a lesser pressure than that delivered by said pressure metering valve, a manually operable valve selectively operable for admitting full metered pressure from said pressure metering valve to said one control chamber, and a governor valve responsive to vehicle speed for directing metered pressure to the other of said control chambers.

8. In change speed gearing controls for a vehicle transmission embodying a plurality of drive trains adapted to connect power and load shafts, one of which includes a reduction gearing torque coupling mechanism and another of which includes a direct drive coupling mechanism, a fluid pressure source, a fluid pressure responsive actuator for each of said mechanisms, the fluid pressure actuator for said reduction gearing mechanism having an actuator chamber and a release chamber, a manual selector valve movable to different positions for selecting drive range and low range, respectively, of transmission operation, a shift valve movable to different positions for selecting reduction or direct drive, said manual selector valve being effective in its drive range position to supply fluid pressure from said source to said reduction gearing actuator chamber and to said shift valve and effective in its low range position to supply fluid pressure to said reduction gearing actuator chamber and to connect said shift valve to exhaust, a piston for controlling the position of said shift valve, control chambers at opposite sides of said piston, a manually operable pressure metering valve for supplying fluid pressure varying in accordance with engine torque to one of said control chambers, a pressure limiting valve normally operable to limit the pressure in said one control chamber to a lesser value than that delivered by said pressure metering valve, an additional manually movable valve selectively operable for admitting full metered pressure from said pressure metering valve to said control chamber, and a governor valve responsive to vehicle speed for delivering metered pressure varying in accordance with vehicle speed to the other of said control chambers, said shift valve being effective when said manual valve is positioned for drive range operation to alternately deliver pressure from said source to both said direct drive actuator chamber and said reduction drive release chamber for direct drive and to connect said direct drive actuator chamber and reduction drive release chamber to exhaust for reduction drive through said transmission.

9. In change speed gearing controls for a vehicle transmission including a plurality of drive trains adapted to connect power and load shafts, one of which trains includes a reduction gearing coupling mechanism and another of which trains includes a direct drive coupling mechanism, a fluid pressure source, a fluid pressure responsive actuator for each of said mechanisms, the actuator for said reduction gearing mechanism having apply and release control chambers, respectively, a manually operable valve for controlling the admission of fluid pressure from said source to said reduction gearing actuator apply chamber, a shift valve for selecting reduction or direct drive, and an additional manually operable valve for admitting pressure fluid to said direct drive coupling mechanism actuator and to said reduction drive release chamber independently of the action of said shift valve.

10. In change speed gearing controls for a vehicle transmission including a plurality of drive trains adapted to selectively connect power and load shafts, one of which trains includes a reduction coupling mechanism and another of which trains includes a direct drive coupling mechanism, a fluid pressure source, a fluid pressure responsive actuator for each of said mechanisms, the actuator for said direct drive mechanism having an apply control chamber and the actuator for said reduction gearing mechanism having apply and release control chambers, respectively, said direct drive actuator apply chamber and said reduction drive release chambers being hydraulically connected in series, a manually operable selector valve for controlling the admission of fluid pressure to said reduction gearing actuator apply chamber, a shift valve adapted to select reduction or direct drive, and an additional manually operable valve operable to admit fluid pressure to direct drive actuator apply chamber and to said reduction gearing actuator release chamber independently of the action of said shift valve.

11. In change speed gearing controls for a vehicle transmission having a plurality of drive trains adapted to selectively connect power and load shafts, one of which trains includes a reduction drive gearing mechanism and another of which trains includes a direct drive coupling mechanism, a fluid pressure source, a fluid pressure responsive actuator for each of said mechanisms, the actuator for said direct drive mechanism including an apply control chamber and the actuator for said reduction gearing mechanism including both apply and release control chambers, a manually operable valve adapted to direct fluid pressure to said reduction drive actuator apply chamber, a hydraulically actuated shift valve effective in one position to direct fluid pressure to said direct drive actuator apply chamber and to said reduction drive actuator release chamber and normally effective in a second position to control the exhaust of fluid pressure from both of said chambers, a second manually operable valve effective in one position to position said shift valve for reduction drive operation, and a third manually operable valve effective in one position to overcontrol said second manually operable valve and to admit fluid pressure to said direct drive actuator apply chamber and to said reduction drive actuator release chamber irrespective of the action of said hydraulically actuated shift valve.

12. In change speed gearing controls for a vehicle transmission including a reduction gearing coupling mechanism and a direct drive coupling mechanism, a fluid pressure source, a fluid pressure responsive actuator for each of said mechanisms, the actuator for said reduction gearing mechanism having apply and release control chambers, respectively, a manually operable selector valve for controlling the admission of fluid pressure from said source to said reduction gearing actuator apply chamber, a shift valve for selecting reduction or direct drive, an additional manually operable over-control valve for selecting direct drive independently of the action of said shift valve, and a pressure regulator valve effective when said transmission is operated in reduction drive to provide a predetermined pressure level in said reduction drive actuator apply chamber and responsive to pressure delivered by either said shift valve or said manually operable overcontrol valve for providing a different pressure level in said reduction drive actuator apply chamber when either said shift valve or overcontrol valve is positioned for direct drive operation of said transmission.

13. In change speed gearing controls for a vehicle tranmission including hydraulically actuated members for providing a plurality of transmission speed ratios, a servomotor for establishing reduction gearing drive, a servomotor for establishing direct drive, a fluid pressure source, the servo for said reduction drive gearing having apply and release control chambers, respectively, said direct drive servo having an apply chamber, said direct drive servo apply chamber and said reduction drive servo release chamber being connected in series, a manually operable selector valve for directing fluid pressure to said reduction gearing servo apply chamber, a hydraulically controlled shift valve for selectively directing fluid pressure to said reduction gearing servo release chamber and to said direct drive servo apply chamber and for selectively connecting the same to exhaust, an additional manually operable valve selectively operable to by-pass said shift valve to direct fluid pressure to said direct drive servo apply chamber and to said reduction gearing servo release chamber, and a pressure regulator valve responsive to pressure delivered by either said shift valve or said last-mentioned manually operable valve for regulating the pressure level of fluid delivered to said direct drive servo apply chamber.

14. Automatic control mechanism for a vehicle transmission including mechanism operable to establish different drive ratios between driving and driven shafts including a fluid pressure source, a shift valve effective in one position to establish one drive ratio and effective in another position to establish a different drive ratio, a governor driven by one of said shafts, a fluid pressure supply line for said governor, a control line connecting said governor to said shift valve, said governor including a casing, a pressure determining valve in said casing operative to deliver a variable pressure from said supply line to said control line in accordance with the speed of rotation of one of said shafts, a flyweight mechanism driven by one of said shafts consisting of a weighted lever element arranged to pivot about the axis of said valve and a weight element arranged to pivot about the same axis as said weighted lever element, said elements being connected to apply a force upon said valve tending to move the same toward a position to increase the pressure delivered to said control line with rise of speed of said one shaft, a spring adapted to transmit force from said weight element to said weighted lever element, a pressure chamber in said casing subject to pressure delivered to said control line for opposing the force applied by said elements to said valve, and a manually operable pressure metering valve for delivering a variable fluid pressure to said shift valve, said last-mentioned pressure acting in opposition to said governor delivered pressure in said control line to position said shift valve in one or the other of its effective positions.

15. Automatic control mechanism for a vehicle transmission including mechanism operable to establish different drive ratios between driving and driven shafts including a fluid pressure source, a shift valve effective in one position to establish one drive ratio and effective in a second position to establish a different drive ratio, a governor driven by one of said shafts, a fluid pressure supply line for said governor, a control line connecting said governor to said shift valve, said governor including a casing, a pressure determining valve in said casing operative to deliver a variable pressure from said supply line to said control line in accordance with the speed of rotation of one of said shafts, a flyweight mechanism driven by one of said shafts consisting of a weighted lever element arranged to pivot about the axis of travel of said valve, a weight element arranged to pivot about the axis of said valve, said weighted lever element being arranged to apply a force on said valve tending to move the same toward a position to increase the pressure delivered to said control line with rise in speed of said one shaft, means limiting the permissible outer movement of said weight element toward said weighted lever element, a spring for transmitting force from said weight element to said weighted lever element, a pressure chamber in said casing subject to pressure delivered to said control line for opposing the force applied by said elements to said valve, and a manually operated pressure metering valve for delivering a variable fluid pressure to said shift valve, said last-mentioned pressure acting in opposition to said governor delivered pressure in said control line to control the position of said shift valve.

16. Automatic control mechanism for a vehicle transmission including mechanism operable to establish different drive ratios between driving and driven shafts including a fluid pressure source, a shift valve effective in one position to establish one drive ratio and effective in a second position to establish a second drive ratio, governor mechanism driven by one of said shafts, a spring for yieldably biasing said shift valve to one effective position, a fluid supply line for said governor, a control line extending from said governor, a pressure chamber of said shift valve connected to said control line for varying the action of said spring, a second spring acting upon said shift valve, a piston member acting upon said second spring, a pressure chamber associated with said piston for varying the action of said second spring, a manually operated metering valve operative to deliver a varying pressure to said last-mentioned chamber for providing a varying force opposing that of said first chamber upon said shift valve, said governor including a casing, a pressure determining valve in said casing operative to deliver a variable pressure to said control line, a flyweight mechanism driven by one of said shafts consisting of a weighted lever element arranged to pivot about the axis of said valve and a weight element arranged to pivot about the axis of said shaft, said lever element being effective to apply force upon said valve tending to move said valve toward a position to increase the pressure delivered to said control line with rise in speed of one of said shafts, a spring disposed between said weight element and said weighted lever element, means for limiting the movement of said weight element, and a pressure chamber in said casing subject to pressure delivered to said control line for opposing the force applied by said element to said valve.

17. A governor for delivering a variable pressure from a fluid pressure supply line to a control line comprising a casing, a pressure metering valve in said casing operative to deliver a variable pressure from said supply line to said control line, a flyweight mechanism adapted to be rotated about an axis at a variable speed consisting of a weighted lever element arranged to pivot about an axis transverse to the axis of rotation, a weight element arranged to pivot about an axis transverse to the axis of rotation, a spring for transferring force from said weight element to said weighted lever element, said weighted lever element being arranged to apply a force to said valve to move said valve toward a position to increase the pressure delivered to said control line with rise in speed of rotation of said flyweight mechanism, and a pressure chamber in said casing subject to pressure in said control line for opposing the force applied by said flyweight mechanism to said valve and tending to move said valve to block off said pressure supply line and to connect said control line to exhaust.

18. A two stage governor for delivering a variable pressure from a fluid pressure supply line to a control line comprising a casing, a pressure metering valve in said casing operative to deliver a variable pressure from said supply line to said control line, a flyweight mechanism adapted to be rotated about an axis at a variable speed and including a lever element arranged to pivot about an axis transverse to the axis of rotation, a weight element arranged to pivot about an axis transverse to the axis of rotation, a spring disposed between said elements for transferring force from said weight element to said lever element, said lever element being arranged to apply a force to said valve tending to move said valve toward a position to increase the pressure delivered to said control line with rise of speed of rotation of said flyweight mechanism, means limiting the pivotal movement of said weight element about its axis, and a pressure chamber in said casing subject to pressure in said control line for opposing the force applied to said valve by said flyweight mechanism and tending to move said valve to block off said pressure supply line and to connect said control line to exhaust.

19. A governor for delivering a variable pressure from a fluid pressure supply line to a control line comprising a casing, a pressure metering valve in said casing operative to deliver a variable pressure from said supply line to said control line, said casing having ports connecting to said supply line, said control line and to exhaust, a flyweight mechanism adapted to be rotated about an axis at a variable speed and including a weighted lever element and a weight element arranged to pivot about an axis transverse to the axis of rotation, a spring for transferring force from said weight element to said weighted lever element, said lever element being effective to move said valve toward a position to block off said exhaust port and to connect said pressure supply port and said control line port with a rise in speed of rotation of said flyweight mechanism, and a pressure chamber in said casing subject to pressure in said control line for opposing the force applied by said flyweight mechanism to said valve and tending to move said valve to block off said pressure supply line and to connect said control line to exhaust.

20. A two stage governor for delivering a variable pressure from a fluid pressure supply line to a control line comprising a casing, a pressure metering valve in said casing operative to deliver a variable pressure from said supply line to said control line, a flyweight mechanism adapted to be rotated about an axis at a variable speed and including a weighted lever element and a weight element arranged to pivot about an axis transverse to the axis of rotation, a spring disposed between said elements for transferring force from said weight to said weighted lever element, said casing having ports connecting to said supply line, said control line and to exhaust, said lever element being effective to move said valve toward a position to block off said exhaust port and to connect said pressure supply port and said control line port upon a rise in speed of rotation of said flyweight mechanism, a stop member for limiting the pivotal motion of said weight element about its pivotal axis, and a pressure chamber in said casing subject to pressure in said control line for opposing the force applied by said flyweight mechanism to said valve and tending to move said valve to block off said pressure supply line and to connect said control line to exhaust.

21. In combination with a torque converter, gearing driven by said torque converter, a fluid pressure source, a fluid pressure supply passage for providing a continuous flow of fluid to said torque converter, a converter discharge passage for conducting pressure fluid from said converter to said gearing for lubrication purposes, a branch discharge passage, a restriction in said branch passage effective to permit restricted fluid discharge from said converter to said gearing, and a valve in said first-mentioned discharge passage responsive to pressure in said passage, said valve effective in one position to block fluid flow in said first-mentioned discharge passage, said valve being effective in a second position to permit fluid pressure discharge through both said first-mentioned passage and said branch passage, and said valve being effective in a third position to permit fluid pressure discharge through both said first-mentioned passage and said branch passage and to permit fluid pressure discharge to the transmission sump through a third discharge passage independently of the gearing.

22. In a change speed gearing control system for a vehicle transmission having hydraulically actuated mechanism for providing a plurality of transmission speed ratios, a servomotor for establishing one transmission drive ratio, a second servomotor for establishing a second drive ratio, said second servomotor having a control chamber hydraulically connected in series with said first servomotor, a fluid pressure source, a shift valve effective in one position to connect both said first servomotor and said second servomotor control chamber to exhaust and effective in a second position to connect both said first servomotor and said second servomotor control chamber to said fluid pressure source, a pressure regulator valve for controlling the pressure level of fluid pressure maintained in said system, and a hydraulic connection between said pressure regulator valve, said first servomotor and said second servomotor control chamber effective to admit pressure to said pressure regulator valve when said shift valve is positioned to direct fluid pressure to said servos, said pressure regulator valve being responsive to pressure supplied to said hydraulic connection to maintain a different pressure in said system when said shift valve is effective to direct pressure to said pressure regulator valve than that maintained when said shift valve is effective to connect said hydraulic connection to exhaust.

23. In a control system for a vehicle transmission having hydraulically actuated mechanism for providing a plurality of drive ratios, a servomotor for establishing one drive ratio, a second servomotor for establishing a second drive ratio, a fluid pressure source, a shift valve for controlling the transmission drive ratio operative in one position to deliver pressure from said source to feed passages leading to said servomotors to cause one of said servomotors to establish a drive ratio and to cause the other of said servomotors to release the drive of a ratio, said shift valve being effective in a second position to connect said feed passages to exhaust, a pressure regulator valve for controlling the pressure level of fluid pressure maintained in said system, and a hydraulic connection between said pressure regulator valve and one of said feed passages for admitting pressure to said pressure regulator valve, said pressure regulator valve being responsive to fluid pressure delivered to said servomotors by said shift valve to maintain a different system pressure when said shift valve is effective to deliver pressure fluid to said servomotors than that maintained when said shift valve is effective to connect said servomotors to exhaust.

24. In a control system for a vehicle transmission having hydraulically actuated mechanism for providing a plurality of drive ratios, a servomotor for establishing one drive ratio, a second servomotor for establishing a second drive ratio, a fluid pressure source, a shift valve for controlling the transmission drive ratio operative in one position to deliver pressure from said source to feed passages leading to said servomotors to cause one of said servomotors to establish a drive ratio and to cause the other of said servomotors to release the drive of a ratio, said shift valve being effective in a second position to connect said feed passages to exhaust, a pressure regulator valve for controlling the pressure level of fluid pressure maintained in said system, and a hydraulic connection between said pressure regulator valve and one of said feed passages for admitting pressure to said pressure regulator valve, said pressure regulator valve being responsive to fluid pressure delivered to said servomotors to maintain a lower system pressure when said shift valve is effective to deliver pressure fluid to said feed passages than that maintained when said shift valve is effective to connect said feed passages to exhaust.

25. Pressure control apparatus comprising in combination, a source of pressure, a delivery space for controlled pressure, a valve adapted when open to admit fluid from the source to the delivery space, means responsive to the pressure of the delivery space for closing the valve, means responsive to the speed of a rotatable object to be controlled for opening the valve, said opening means comprising a rotatable member adapted to be connected to the object to move under centrifugal force to urge the valve toward open position, and a second rotatable member adapted to be connected to the object to move under centrifugal force to urge the first rotatable member in the direction to open the valve.

26. Pressure control apparatus comprising in combination, a source of pressure, a delivery space for controlled pressure, a valve adapted when open to admit fluid from the source to the delivery space, means responsive to the pressure of the delivery space for closing the valve, means responsive to the speed of a rotatable object to be controlled for opening the valve, said opening means comprising a rotatable member adapted to be connected to the object to move under centrifugal force to urge the valve toward open position, a second rotatable member adapted to be connected to the object to move under centrifugal force to urge the first rotatable member in the direction to open the valve, and resilient means for transferring force tending to open the valve from the second member to the first member.

27. Pressure control apparatus comprising in combination, a source of pressure, a delivery space for controlled pressure, a valve adapted when open to admit fluid from the source to the delivery space, means responsive to the pressure of the delivery space for closing the valve, means responsive to the speed of a rotatable object to be controlled for opening the valve, said opening means comprising a rotatable member adapted to be connected to the object to move under centrifugal force to urge the valve toward open position, a second rotatable member adapted to be connected to the object to move under centrifugal force to urge the first rotatable member in the direction to open the valve, and resilient means for transferring force tending to open the valve from the second member to the first member, and means preventing movement of the second member under centrifugal force above a predetermined speed of the object to be controlled.

References Cited in the file of this patent

UNITED STATES PATENTS

| | | |
|---|---|---|
| 880,030 | Leavitt | Feb. 25, 1908 |
| 1,173,180 | Deffert | Feb. 29, 1916 |
| 1,766,648 | Keller | June 24, 1930 |
| 1,873,688 | Walker | Aug. 23, 1932 |
| 1,905,065 | Scholl | Apr. 25, 1933 |
| 2,144,256 | Duffield | Jan. 17, 1939 |
| 2,168,372 | Tabb | Aug. 8, 1939 |
| 2,187,667 | Sinclair et al. | Jan. 16, 1940 |
| 2,195,605 | Thompson | Apr. 2, 1940 |
| 2,204,872 | Thompson | June 18, 1940 |
| 2,214,290 | Ward | Sept. 10, 1940 |
| 2,286,713 | Burks | June 16, 1942 |
| 2,298,105 | Canaan | Oct. 6, 1942 |
| 2,324,514 | Kalin | July 20, 1943 |
| 2,325,090 | Alison | July 27, 1943 |
| 2,372,817 | Dodge | Apr. 3, 1945 |
| 2,382,034 | Wemp | Aug. 14, 1945 |
| 2,423,812 | Karl et al. | July 8, 1947 |
| 2,584,965 | McFarland | Feb. 5, 1952 |
| 2,595,969 | McFarland | May 6, 1952 |
| 2,603,943 | Everden | July 22, 1952 |
| 2,604,197 | Livermore | July 22, 1952 |
| 2,625,056 | Kelley | Jan. 13, 1953 |
| 2,627,189 | McFarland | Feb. 3, 1953 |
| 2,640,373 | Jandasek | June 2, 1953 |
| 2,693,813 | Tucker | Nov. 9, 1954 |

FOREIGN PATENTS

| | | |
|---|---|---|
| 966,238 | France | Mar. 1, 1950 |
| 974,256 | France | Sept. 27, 1950 |